United States Patent
Grokop

(10) Patent No.: US 9,360,323 B2
(45) Date of Patent: Jun. 7, 2016

(54) SYSTEMS AND METHODS FOR ESTIMATING MOVEMENTS OF A VEHICLE USING A MOBILE DEVICE

(71) Applicant: Tourmaline Labs, Inc., San Diego, CA (US)

(72) Inventor: Leonard H. Grokop, San Diego, CA (US)

(73) Assignee: Tourmaline Labs, Inc., San Diego, CA (US)

( * ) Notice: Subject to any disclaimer, the term of this patent is extended or adjusted under 35 U.S.C. 154(b) by 0 days.

(21) Appl. No.: 14/622,502

(22) Filed: Feb. 13, 2015

(65) Prior Publication Data

US 2015/0233718 A1     Aug. 20, 2015

Related U.S. Application Data

(60) Provisional application No. 61/940,777, filed on Feb. 17, 2014.

(51) Int. Cl.
| | |
|---|---|
| *G01C 21/10* | (2006.01) |
| *G01C 21/16* | (2006.01) |
| *H04W 4/02* | (2009.01) |
| *H04W 64/00* | (2009.01) |
| *G06Q 40/08* | (2012.01) |

(52) U.S. Cl.
CPC .............. *G01C 21/165* (2013.01); *G06Q 40/08* (2013.01); *H04W 4/027* (2013.01); *H04W 64/006* (2013.01)

(58) Field of Classification Search
CPC ... G01C 21/165; G06Q 40/08; H04W 64/006; H04W 4/027

USPC .......................................................... 701/501
See application file for complete search history.

(56) References Cited

U.S. PATENT DOCUMENTS

| | | | |
|---|---|---|---|
| 6,532,419 | B1 | 3/2003 | Begin et al. |
| 6,801,855 | B1 | 10/2004 | Walters et al. |
| 7,275,008 | B2 | 9/2007 | Plyvanainen |
| 7,835,863 | B2 | 11/2010 | Lokshin et al. |

(Continued)

FOREIGN PATENT DOCUMENTS

WO     2004041086 A1     5/2004

OTHER PUBLICATIONS

International Search Report and Written Opinion dated May 20, 2015 for PCT Patent Application No. PCT/US2015/015962.

*Primary Examiner* — Maceeh Anwari
(74) *Attorney, Agent, or Firm* — The Mueller Law Office, P.C.

(57) ABSTRACT

A method of computing an orientation of a mobile device in a vehicle includes collecting accelerometer data from the mobile device. The accelerometer data are subdivided into frames, each frame being a quantity of time in which a sample data point is taken. Statistics are calculated for each frame, including (i) a mean and (ii) a standard deviation of the magnitude of the acceleration vectors. Device usage delimiters, marking start and end points of a coherent block, are computed, the coherent block being consecutive frames in which the mobile device stays in the same orientation relative to the vehicle. A gravity vector is estimated using the statistics in coherent blocks. A nullspace is computed from the gravity vector, the nullspace being a plane orthogonal to the gravity vector. The accelerometer data is projected onto the nullspace, resulting in an estimated orientation of the mobile device in the vehicle.

20 Claims, 20 Drawing Sheets

(56) References Cited

U.S. PATENT DOCUMENTS

| | | |
|---|---|---|
| 8,290,480 B2 | 10/2012 | Abramson et al. |
| 8,459,094 B2 | 6/2013 | Yanni |
| 8,589,015 B2 | 11/2013 | Willis et al. |
| 8,635,091 B2 | 1/2014 | Amigo et al. |
| 8,718,932 B1 | 5/2014 | Pack et al. |
| 8,762,055 B2 | 6/2014 | Nash |
| 8,788,193 B2 | 7/2014 | Fauci et al. |
| 8,930,229 B2 | 1/2015 | Bowne et al. |
| 8,930,231 B2 | 1/2015 | Bowne et al. |
| 2009/0259424 A1 | 10/2009 | Dutta et al. |
| 2011/0077891 A1 | 3/2011 | Koenig |
| 2012/0129544 A1 | 5/2012 | Hodis et al. |
| 2012/0172055 A1 | 7/2012 | Edge |
| 2012/0185204 A1 | 7/2012 | Jallon |
| 2012/0253585 A1 | 10/2012 | Harvie |
| 2013/0046510 A1 | 2/2013 | Bowne et al. |
| 2013/0179198 A1 | 7/2013 | Bowne et al. |
| 2013/0197845 A1 | 8/2013 | Keal et al. |
| 2014/0108058 A1 | 4/2014 | Bourne et al. |
| 2014/0149145 A1 | 5/2014 | Peng et al. |
| 2014/0278206 A1 | 9/2014 | Girod et al. |

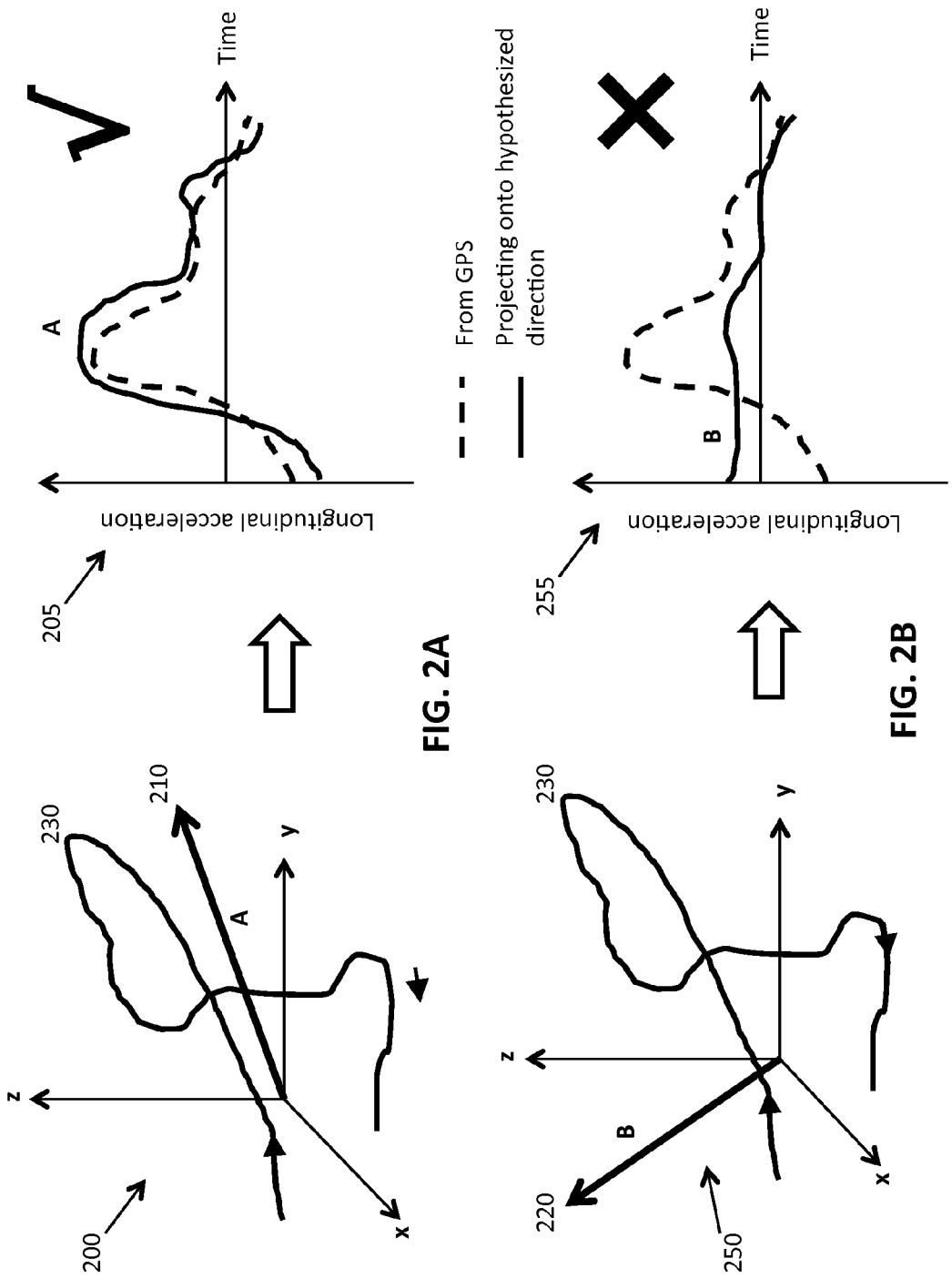

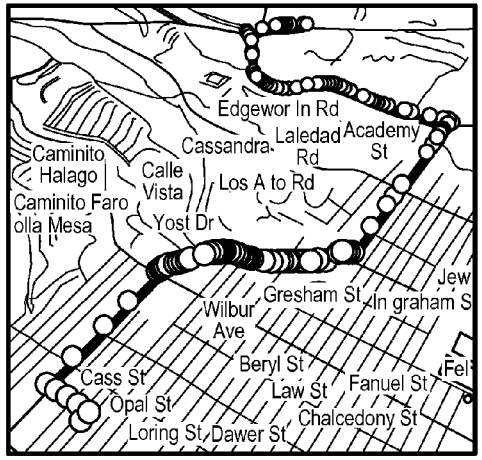 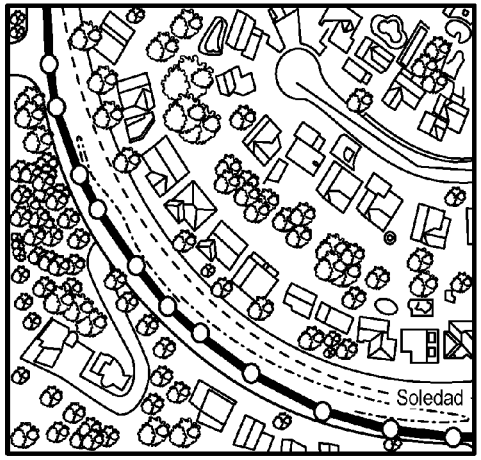
FIG. 10A  FIG. 10B
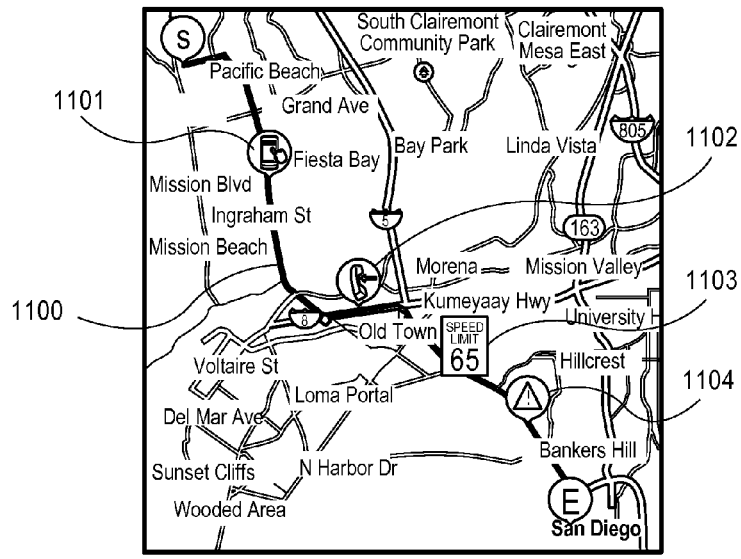
FIG. 11

| 1 | 7 | 2 |
|---|---|---|
| 1 | 2 | 3 |
| $C_{3,1}=0$ 7 | $C_{3,2}=1$ 2 | $C_{3,3}=2$ 3 |
| 8 | 7 | $C_{4,3} = \min(\infty, C_{3,2}+1, C_{3,3}+2)$ 3 |

Invalid

FIG. 16

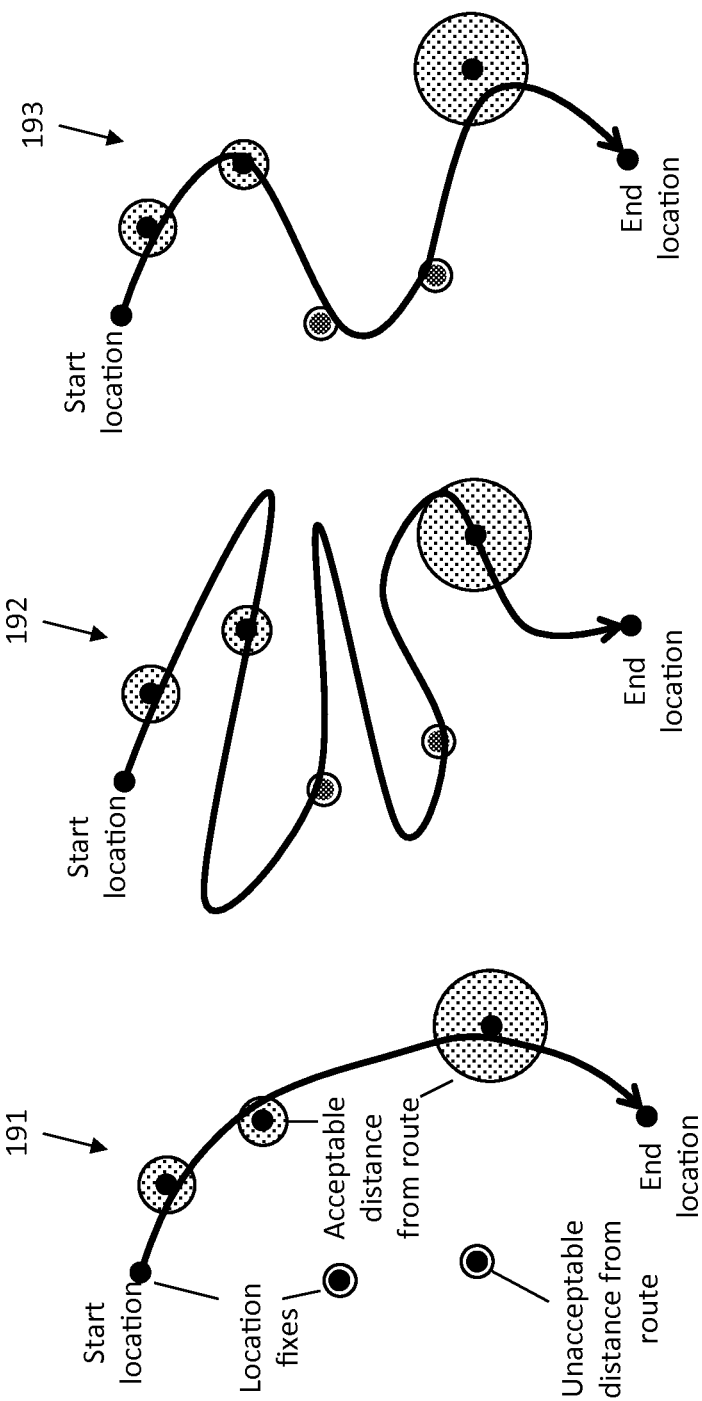

| DATE | TIME | ELAPSED TIME | LAT | LONG | LEG | LEG FRAC | ROAD NAME | SPEED | MILEAGE | LINEAR G_FORCE | LATERAL G-FORCE | VERTICAL G-FORCE | DATA UNUSABLE | RIGHT TURN | LEFT TURN | HARD BRAKE | HARD ACCEL | HARD RIGHT CORNER | HARD LEFT CORNER |
|---|---|---|---|---|---|---|---|---|---|---|---|---|---|---|---|---|---|---|---|
| 2/6/2014 | 12:12:33 | 453000 | 32.8263 | -117.2794 | 353 | 0.609 | Palomar Ave | 7.19 | 5.082 | -0.23 | 0.03 | -0.02 | 0 | 0 | 0 | FALSE | FALSE | FALSE | FALSE |
| 2/6/2014 | 12:12:33 | 453250 | 32.8263 | -117.2794 | 354 | 0.962 | Palomar Ave | 5.91 | 5.083 | -0.26 | 0.05 | -0.02 | 0 | 0 | 0 | FALSE | FALSE | FALSE | FALSE |
| 2/6/2014 | 12:12:33 | 453500 | 32.8263 | -117.2795 | 356 | 0.347 | Palomar Ave | 4.55 | 5.085 | -0.27 | 0.05 | -0.03 | 0 | 0 | 0 | FALSE | FALSE | FALSE | FALSE |
| 2/6/2014 | 12:12:34 | 453750 | 32.8263 | -117.2795 | 357 | 0.402 | Palomar Ave | 2.92 | 5.085 | -0.32 | 0.07 | -0.02 | 0 | 0 | 0 | TRUE | FALSE | FALSE | FALSE |
| 2/6/2014 | 12:12:34 | 454000 | 32.8263 | -117.2795 | 358 | 0.002 | Palomar Ave | 1.03 | 5.086 | -0.37 | 0.10 | -0.04 | 0 | 0 | 0 | TRUE | FALSE | FALSE | FALSE |
| 2/6/2014 | 12:12:34 | 454250 | 32.8263 | -117.2795 | 358 | 0.006 | Palomar Ave | 0.00 | 5.086 | -0.37 | 0.09 | -0.05 | 0 | 0 | 0 | TRUE | FALSE | FALSE | FALSE |
| 2/6/2014 | 12:12:34 | 454500 | 32.8263 | -117.2795 | 358 | 0.006 | Palomar Ave | 0.00 | 5.086 | -0.37 | 0.09 | -0.05 | 0 | 0 | 0 | TRUE | FALSE | FALSE | FALSE |
| 2/6/2014 | 12:12:35 | 454750 | 32.8263 | -117.2795 | 358 | 0.006 | Palomar Ave | 0.00 | 5.086 | -0.33 | 0.08 | -0.06 | 0 | 0 | 0 | TRUE | FALSE | FALSE | FALSE |
| 2/6/2014 | 12:12:35 | 455000 | 32.8263 | -117.2795 | 358 | 0.006 | Palomar Ave | 0.00 | 5.086 | -0.28 | 0.07 | -0.04 | 0 | 0 | 0 | FALSE | FALSE | FALSE | FALSE |
| 2/6/2014 | 12:12:35 | 455250 | 32.8263 | -117.2795 | 358 | 0.006 | Palomar Ave | 0.00 | 5.086 | -0.24 | 0.06 | 0.00 | 0 | 0 | 0 | FALSE | FALSE | FALSE | FALSE |
| 2/6/2014 | 12:12:35 | 455500 | 32.8263 | -117.2795 | 358 | 0.006 | Palomar Ave | 0.00 | 5.086 | -0.18 | 0.04 | -0.03 | 0 | 0 | 0 | FALSE | FALSE | FALSE | FALSE |

FIG. 21

SYSTEMS AND METHODS FOR ESTIMATING MOVEMENTS OF A VEHICLE USING A MOBILE DEVICE

RELATED APPLICATIONS

This application claims priority from U.S. Provisional Patent Application No. 61/940,777 filed on Feb. 17, 2014 and entitled "Systems and Methods for Estimating Movements of a Vehicle Using a Mobile Device", which is hereby incorporated by reference for all purposes.

BACKGROUND OF THE INVENTION

Mobile devices such as smartphones and tablets have become a common tool for both personal uses as well as business applications. Mobile devices are used in many ways in addition to their traditional role as a communication device, such as for performing shopping transactions, mapping destinations, measuring health parameters, and recording images. The data gathered during usage of a mobile device can be used for analysis purposes, such as for tracking fitness, most frequently visited locations, consumer preferences, and the like.

Automobile insurance is an area in which telematics from mobile devices can be useful. For example, a mobile device can be used to provide information on the number of trips and miles traveled, and then a generating a score for insurance underwriting purposes, based on the data. In another example, a mobile device may be fixed into a vehicle, and driver operation characteristics such as location data, vehicle speed, acceleration can be gathered and utilized by an insurance company.

As mobile devices become more widespread in use, there continue to be further opportunities to utilize these devices as valuable tools in insurance and other areas.

SUMMARY OF THE INVENTION

In some embodiments, a method of computing an orientation of a mobile device in a vehicle includes collecting accelerometer data from the mobile device traveling in the vehicle. The accelerometer data includes acceleration vectors with acceleration values for three orthogonal axes. The accelerometer data are subdivided into frames, each frame being a quantity of time in which a sample data point is taken. Statistics are calculated for each frame, including (i) a mean of the acceleration vectors and (ii) a standard deviation of the magnitude of the acceleration vectors. Device usage delimiters, marking start and end points of a coherent block, are computed, the coherent block being consecutive frames in which the mobile device stays in the same orientation relative to the vehicle. A gravity vector is estimated using the statistics from the accelerometer data in coherent blocks. A nullspace is computed from the gravity vector, the nullspace being a plane orthogonal to the gravity vector. The accelerometer data is projected onto the nullspace, resulting in an estimated orientation of the mobile device in the vehicle.

In other embodiments, a method of inferring movements of a vehicle includes collecting accelerometer data from the mobile device traveling in the vehicle. The accelerometer data includes acceleration vectors with acceleration values for three orthogonal axes. The accelerometer data are subdivided into frames, each frame being a quantity of time in which a sample data point is taken. Statistics are calculated for each frame, including (i) a mean of the acceleration vectors and (ii) a standard deviation of the magnitude of the acceleration vectors. Device usage delimiters, marking start and end points of a coherent block, are computed, the coherent block being consecutive frames in which the mobile device stays in the same orientation relative to the vehicle. A gravity vector is estimated using the statistics from the accelerometer data in coherent blocks. A nullspace is computed from the gravity vector, the nullspace being a plane orthogonal to the gravity vector. The accelerometer data is projected onto the nullspace, the nullspace providing a forward direction of vehicle movement. Global positioning system (GPS) data is collected during a plurality of brief segments of time to obtain speed and position values. Longitudinal and lateral accelerometer data are correlated with longitudinal G-forces estimates from the GPS data, the longitudinal and lateral accelerometer data being relative to the nullspace. Speed drift correction is performed by (a) identifying periods of time when the vehicle is stationary, based on GPS position values, and setting G-force values to zero for those periods. Dead reckoning is performed to determine vehicle speed estimates, including calculating vehicle speed estimates for an interval between GPS time segments.

BRIEF DESCRIPTION OF THE DRAWINGS

Each of the aspects and embodiments of the invention described herein can be used alone or in combination with one another. The aspects and embodiments will now be described with reference to the attached drawings.

FIGS. 2A-2B are exemplary charts demonstrating finding a rotation matrix between vehicle and device accelerometer vectors.

FIGS. 10A-10B show examples of computed routes.

FIG. 11 shows an illustration of dead reckoning.

FIG. 16 is an exemplary diagram of determining a minimum cost path.

FIGS. 19A-19C are exemplary diagrams of a goal of a route interpolation algorithm.

FIG. 21 is a table of exemplary telematics data.

DETAILED DESCRIPTION OF THE EMBODIMENTS

Overview

Figure 1B:
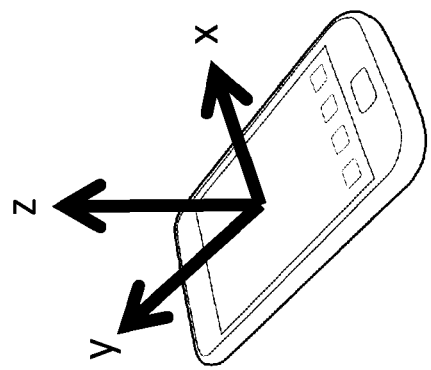
FIGS. 1A-1B are exemplary diagrams of vehicle and device reference frames.

A system for estimating movements of a vehicle using a mobile device is described. The device need not be tethered to the vehicle and can be in any position/orientation inside the vehicle. Methods for computing the orientation of a mobile device relative to the vehicle are also described. The movements estimated include G-forces, speed and position of the vehicle. Estimates of these movements are produced by collecting and processing data from various sensors on the device and fusing this information together with road geometry and route information obtained through a wireless connection to an online network. Movement estimates may be computed in real-time or in post-processing after the trip is complete. In the present disclosure, a vehicle may refer to an automobile, or other moving structure such as a train, airplane, or boat. The term mobile device shall refer to, for example, a smartphone, tablet, smartwatch, or other electronic device equipped with at least an accelerometer and that is capable of capturing data from the accelerometer. This device may be a mobile device or other device located within the vehicle.

While G-force estimates can be obtained by essentially differentiating speed data outputted by the GPS engine alone, such estimates are typically noisy and susceptible to error when satellite visibility is poor. Estimates obtained using the sensor-fusion approach described below experience superior accuracy to those derived from the GPS engine alone. They may also be obtained continuously throughout a trip while keeping the GPS engine turned off most of the time. This greatly improves battery performance.

The estimated movements can be used for a variety of purposes, such as determining how safely the user is driving by detecting occurrences of hard braking, accelerating, or cornering. This information could be used by an underwriter to provide a discount on the user's auto insurance. It could also be used to score the user's driving for training or safety purposes. The estimated movements can also be used to track the user for navigational purposes without relying heavily on GPS. This may be advantageous when GPS coverage is poor, such as in dense urban areas, or when using the GPS continuously causes excessive battery drain. Alternative uses include monitoring vehicle dynamics such as train acceleration, cornering forces, measuring subway rattling etc.

There may be periods during which the movement of the device differs from that of the vehicle. As the system inherently estimates vehicle movement via device movement, such periods may introduce inaccuracy into the estimates. For example, if the device becomes dislodged during a hard brake, or if the user picks it up to check email, the longitudinal, lateral and vertical acceleration estimates may be inaccurate. The system deals with this by detecting and flagging segments during which device movement differs from vehicle movement. If an insurer is underwriting on features derived from this data (e.g. hard braking), then they may wish to ignore flagged data segments, in order to avoid potentially introducing errors into their models. Similarly, services presenting driver behavior information to the user for training or safety purposes may wish to ignore segments of data flagged as inaccurate. Derived movement estimates such as speed and position may also benefit from knowing that certain G-force data has been flagged as inaccurate. G-force data may also be flagged as inaccurate for reasons other than detected device movement.

In various embodiments of systems and methods disclosed herein, data from only the accelerometer is used to estimate orientation of a mobile device in a vehicle, by identifying and using acceleration data during time periods in which the device stays approximately in a constant orientation relative to the vehicle. These time periods, or coherent blocks, are marked with delimiters, and a gravity vector is estimated from the data in the coherent blocks. The orientation of the mobile device, and consequently a forward direction of vehicle movement, is estimated by projecting the accelerometer onto a nullspace, where the nullspace is computed from the gravity vector. After the orientation of the mobile device relative to the vehicle is found from the accelerometer data, GPS data can be used to infer other quantities related to vehicle movement, such as vehicle speed estimates and vehicle positions along a route.

Real-Time Operation Vs. Post-Processing Operation

The system can operate in one of two modes: in real-time mode, or in post-processing mode. In real time operation mode the system buffers data over a short time window and outputs movement quantities such as G-forces, speed, position, etc. with minimal delay, e.g. such that they are available within 1-30 seconds of occurring. In post-processing mode the system buffers relevant data during the drive and then computes all quantities after the drive has concluded.

Post-processing computation may take place immediately after the drive has concluded or after being triggered by some event occurring at a later time. For example, post-processing computation may be triggered when the system detects that the user is charging their device, the user has returned home, the user is connected to a WiFi access point, or the time of day is in a certain range.

The triggering event may be generated based on a set of rules. For example, the trigger for performing post-processing computation may be that the device is both 1) connected to a WiFi access point and, 2) charging. Another trigger could be a combination of 1) connected to a WiFi access point and, 2) charging, and 3) time of day is between 3 AM and 5 AM. By delaying post-processing computation to a time when the user is charging the device, battery life can be increased. Similarly, delaying to a time when the user is connected to WiFi may reduce data costs on the user's cellular plan.

Computing movement quantities after the drive via post-processing has two potential benefits—power savings and accuracy improvement. Power savings may come from not having to keep the processor continually running throughout the drive, e.g. all computation is performed in one go, after the drive has completed. Accuracy improvement comes from being able to compute movement quantities at a particular time using data from both before and after that time. In signal-processing parlance this is called anti-causal processing. This is contrasted with causal signal-processing which only uses data captured from previous times.

Estimating Acceleration

In the following description, the terms G-force and acceleration are used synonymously. Acceleration is measured in meters per second squared ($m/s^2$), G-force is measured in g's, with 1 g=9.80707 $m/s^2$. Acceleration generated by vehicle movements is estimated in three orthogonal directions: forward/backward, right/left, and up/down. Thus, accelerometer data collected by the mobile device that is traveling in the vehicle may be expressed as acceleration vectors with acceleration values for three orthogonal axes. Forward/backward acceleration is generated by the vehicle accelerating/braking, which is referred to as longitudinal acceleration, with positive values corresponding to accelerating and negative values corresponding to braking Right/left acceleration is generated by the centrifugal force when the vehicle corners or swerves. This is referred to as lateral acceleration, with positive values corresponding to right turns and negative values to left turns. Up/down G-forces are generated when the slope of the road changes, or when the vehicle drives over bumps such as speed humps, potholes, or dips in the road. This is referred to as vertical acceleration, with positive values corresponding to upward acceleration and negative values to downward acceleration. In practice there is always a non-zero amount of acceleration in all three directions: longitudinal, lateral and vertical. For instance, at a given moment when a vehicle is turning a corner, it will likely be either increasing or decreasing in speed slightly, and also will be experiencing vertical movement up and down as it bumps along the road. Thus all three acceleration components will be present, where in this example of a vehicle turning a corner, the lateral component will be largest.

The vehicle acceleration vector is a three-dimensional quantity that characterizes the acceleration at a particular point in time in the longitudinal, lateral, and vertical directions, according to the frame of reference of the vehicle. When there is no acceleration, the vehicle acceleration vector is (0,0,0). For instance an acceleration vector of (0.9087,0,0) means the vehicle is accelerating in the forward longitudinal direction at 0.9807 m/s$^2$ or 0.1 g. An acceleration vector of (−0.9087,0,0) means the vehicle is braking at 0.1 g. An acceleration vector of (0,0.9087,0) means the vehicle is turning right with a centrifugal force of 0.1 g. Similarly (0,−0.9087,0) means the vehicle is turning left with a centrifugal force of 0.1 g. An acceleration vector of (0,0,0.9087) means the vehicle is accelerating away from the earth at 0.1 g. Similarly (0,0,−0.9087) means the vehicle is accelerating toward the earth at 0.1 g. The primary goal of the system is to estimate the vehicle acceleration vector at various points in time throughout the trip, such as every 0.1-1 seconds.

The device acceleration vector is the three-dimensional quantity that characterizes the acceleration at a particular point in time in the (x, y, z) reference frame of the mobile device. The device acceleration vector incorporates a gravity component, known as the gravity vector. The gravity vector is a vector with magnitude 1 g=9.80707 m/s$^2$ that points in the direction of gravity with respect to the frame of reference of the device. For example, if the device is lying horizontally face-up, the gravity vector is (9.80707, 0, 0). If the device is not accelerating, the device acceleration vector will be equal to the gravity vector. If the device is fixed to the vehicle in an unknown orientation, the movements of the device will match those of the vehicle, but rotated by an unknown rotation matrix. As such the device acceleration vector will be equal to the vehicle acceleration vector transformed by the rotation matrix, plus the gravity vector. This rotation matrix may be characterized by one or more angles.

Figure 1A:
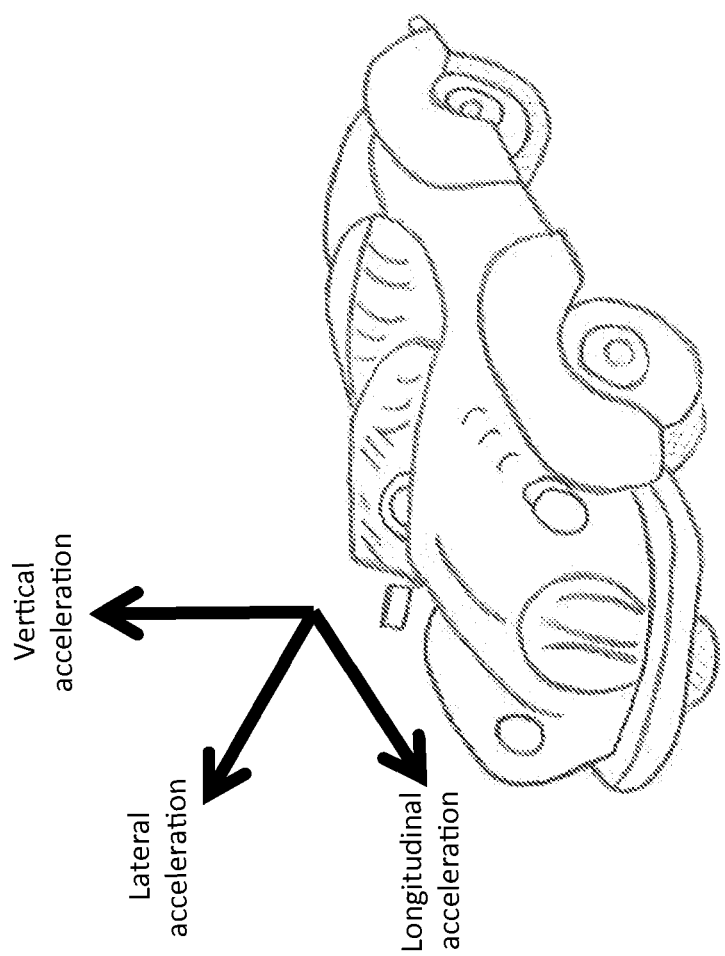

The relationship between the reference frame of the vehicle and device, and the associated acceleration vectors, is illustrated in FIGS. 1A and 1B. FIG. 1A shows an exemplary vehicle reference frame, and FIG. 1B shows an exemplary mobile device reference frame, where the mobile device is a smartphone in this embodiment.

High-Level Explanation of Sensor Fusion Approach

Estimating vehicle acceleration is simplified when the mobile device is fixed to the vehicle in a known orientation. This can be done using motion sensors alone. When the orientation of the mobile device is unknown and potentially changes throughout the course of the trip, it is still possible to determine the magnitude of the vehicle acceleration vector from motion sensors alone, but determining the direction of the vehicle acceleration vector such that it can be correctly resolved into constituent longitudinal, lateral and vertical components, is difficult. If done incorrectly, a braking event could be confused with an accelerating or cornering event.

The system of the present specification overcomes this difficulty by fusing information from both motion sensors and GPS to estimate the vehicle acceleration vector, each time sample. Motion sensors used could include accelerometer, magnetometer and gyroscope, although some embodiments use just the accelerometer data. Data coming from these sensors is combined and processed to produce the device acceleration vector.

The unknown rotation matrix between the vehicle and device acceleration vectors is determined in the following way. First, a sequence of longitudinal acceleration estimates is derived from the speed values outputted by the GPS subsystem. There are various ways of doing this (described below), all of which involve some form of differentiation of GPS speed values. Alternatively longitudinal acceleration estimates can be derived from position values outputted from the GPS sub-system or other location-based service, though these tend to be less accurate. Second, a sequence of device accelerometer vectors is projected onto a variety of hypothesis subspaces; each subspace is associated with a different rotation matrix. Each hypothesis subspace results in a different sequence of longitudinal acceleration estimates. These sequences are compared to the longitudinal acceleration estimates derived from the GPS. The hypothesis subspace corresponding to the sequence with the closest match is chosen and its associated rotation matrix is selected as the unknown rotation matrix. The device acceleration vector is then rotated by this matrix, with the gravity component being subtracted from the vertical element to produce the vehicle acceleration vector. The three elements of this vector are then the longitudinal, lateral, and vertical acceleration of the vehicle for this time sample.

For example, if the sequence of longitudinal acceleration samples obtained from the GPS data is {−0.3, −0.1, 0.2, 0.5, 0.7} g, the sequence of longitudinal acceleration samples obtained from the motion sensor data using a first hypothesis subspace is {0.4, 0.4, −0.3, −0.5, 0.3} g, and the sequence of longitudinal acceleration samples obtained from the motion sensor data using a second hypothesis subspace is {−0.3, −0.1, 0.2, 0.5, 0.8} g, then the second subspace is deemed a better hypothesis and its associated rotation matrix selected. The procedure is illustrated in FIGS. 2A-2B, which demonstrate an example of finding the rotation matrix between the vehicle and device accelerometer vectors. Different directions of longitudinal vehicle acceleration are hypothesized, with direction A being shown as arrow 210 in the graph 200 of FIG. 2A, and direction B being shown as arrow 220 in the graph 250 of FIG. 2B. The trajectory 230 of the device acceleration vector is projected onto these different hypothesis directions as shown in graphs 205 and 255. The direction that results in the closest match with the crude longitudinal acceleration estimate derived from GPS speed data is chosen and its corresponding rotation matrix used. In the example of FIG. 2A-2B, hypothesis direction A results in a closer match than hypothesis direction B, as shown in the graphs 205 and 255.

Figure 3:
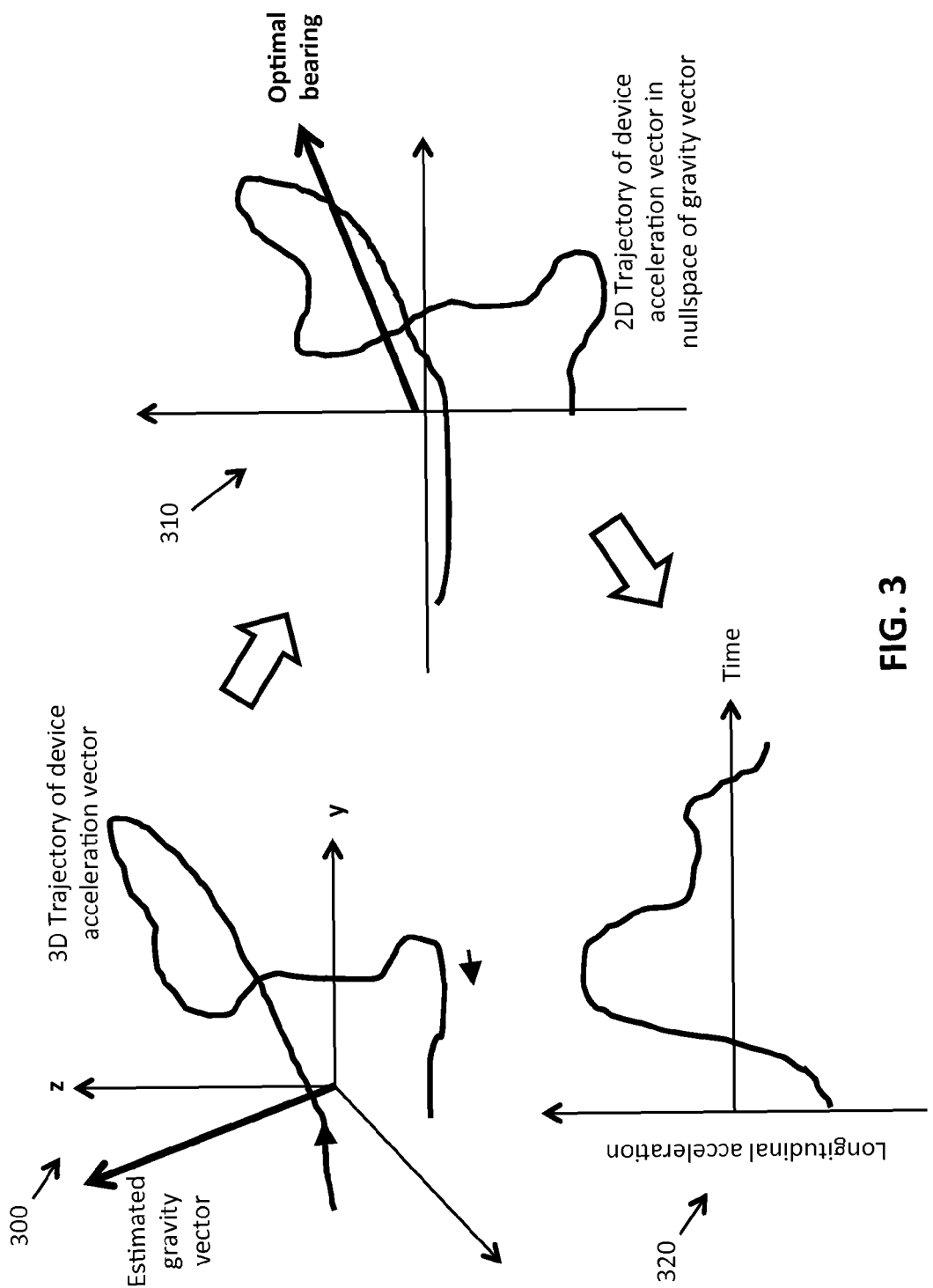
FIG. 3 provides exemplary graphs that demonstrate determining a rotation matrix.

In one embodiment, prior to choosing a hypothesis subspace the gravity vector is estimated and the device acceleration vector projected onto the subspace orthogonal to it. The hypothesis subspaces/rotation matrices are then restricted to lie in this subspace. The gravity vector can be estimated using only the sequence of device accelerometer vectors, i.e. without using data from GPS. This can be done in many ways, for example by computing a moving-average of the sequence of device accelerometer vectors. Thus, this embodiment finds the unknown rotation matrix by first determining the vertical direction of the vehicle's frame of reference using only motion sensor data, and then determining the directions of longitudinal vs. lateral acceleration using both motion sensor and GPS data. This corresponds to first finding the tilt of the mobile device given its resting position in the vehicle, and then finding the orientation of the device with respect to the orientation of the vehicle, i.e. the difference between the bearing of the device and the heading direction of the vehicle. This is illustrated in FIG. 3, determining rotation matrix in two parts. This procedure involves first finding the gravity vector using only motion sensor data, then finding the bearing of device with respect to the vehicle using both GPS and motion sensor data. In graph 300, data is projected onto the nullspace of the gravity vector, where the 3D trajectory of the device acceleration vector and the estimated gravity vector are shown. In graph 310, the data is projected onto the optimal bearing. In graph 320, the resulting estimate is shown.

An advantage to this sensor fusion technique is that many observations—longitudinal G-force estimates from GPS data—are used to estimate a small number of parameters: the unknown rotation matrix/angle, an approach that will naturally lead to high accuracy estimates due to the law of large numbers.

Using only acceleration, the approach outlined is valid only over periods where the device orientation is fixed relative to the vehicle (i.e. the unknown rotation matrix between the vehicle and device acceleration vectors is constant over this period) and additionally the gravity direction is not changing relative to the vehicle. When this is not the case, the changing rotation matrix may be determined by measuring how the device is rotating during the sampling period. This is done by incorporating sensor measurements provided by the device's magnetometer or gyroscope. Note that these additional measurements are only necessary when the device orientation is changing significantly (e.g. the user is picking up, putting down, waving, etc. his/her device). For small changes in orientation, the device can be treated as fixed and the rotation matrix is considered constant.

System Design

Figure 4:
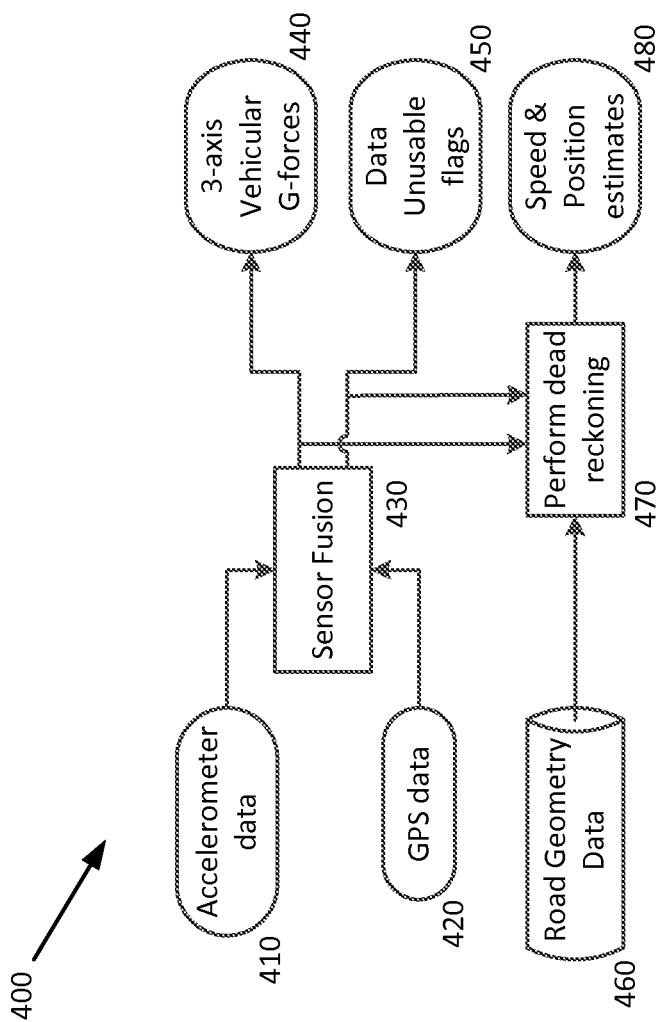
FIG. 4 is an exemplary high-level diagram of a system of the present disclosure.

The system detects the start and end of a drive. An exemplary high-level system overview is shown in flowchart 400 of FIG. 4. During a detected drive the system collects continuous raw accelerometer data 410 and fragmentary GPS data 420. The fragmentary GPS data 420 refers to GPS data being collected only periodically, or at brief segments, rather than continuously throughout the drive. Speed and position values may be obtained from the GPS data. This data is fused at sensor fusion step 430 to estimate G-forces 440 along three axes relative to the vehicle's frame of reference: longitudinal, lateral and vertical. Flags 450 for segments of data that are unusable due to known inaccuracies (such as device movement in the user's hand) are also computed. The fragmentary GPS data 420 is also used to infer a route based on road geometry data 460 using techniques detailed later in the section "Inferring a drive route from sparse location fixes using a driving directions AP." Continuous speed and position estimates 480 are then derived from a combination of the inferred route and the G-force data via dead reckoning techniques 470.

A more detailed system overview is as follows. The system is described in terms of its post-processing mode of operation. The description is applies to the real-processing mode of operation with trivial modifications.

The accelerometer sensor is periodically calibrated when the device is not moving. A motion classification method is employed to detect the start of a drive. The motion classification method can be techniques described in, for example, U.S. patent application Ser. No. 14/523,391, entitled "Systems and Methods for Collecting and Transmitting Telematics Data from a Mobile Device" filed on Oct. 24, 2014, which is owned by the assignee of the present application and is hereby incorporated by reference for all purposes.

During a drive, the following occurs. When a drive start is detected, the system starts continuously logging raw accelerometer data until the drive end has been detected. For example, $F_S$=20-200 accelerometer data vectors are logged per second, where $F_S$ is the sampling rate. The continuous accelerometer data is subdivided into frames of width $1/F_G$ where $F_G$ represents the rate at which movement quantities are outputted (in samples per sec). Thus, a frame is a quantity of time in which a sample data point is taken. The subdividing into frames can occur during collection of the data, or after the drive is completed. An exemplary range for $F_G$ is 1-10 Hz, which would correspond to frames of 1 second to 0.1 sec. From each frame, sufficient statistics are computed and stored for later processing. These sufficient statistics are the mean of the acceleration vector, and the standard deviation of the accelerometer norm (i.e., magnitude of the acceleration vector). The mean of the acceleration vector may also be referred to as the accelerometer means along the three axes (x, y and z). All later computation is performed using only the sufficient statistics; hence the raw data can be discarded. During the detected drive, GPS data, including location and speed data, is also collected. This is done in a fragmentary (not continuous) manner with the GPS engine being turned on and off periodically. Typically GPS is acquired for 15-30 seconds every minute. All GPS samples collected during the drive are stored for later processing. When turned on, GPS fixes are acquired at a rate of, for example, 0.5-4 Hz. These fixes are later resampled/interpolated to provide one fix every frame.

During post-processing of movement quantities, the following occurs. The accelerometer means that were computed from the raw accelerometer data are first calibrated by applying calibration factors to the raw accelerometer data. From this the gravity vectors are estimated, one for each frame. The direction of the gravity vector, in the vertical direction, is determined using acceleration statistical data from several frames in which the vertical direction is constant relative to both the device and the vehicle. For each gravity vector, a nullspace (consisting of two vectors) is computed. The calibrated accelerometer means are then projected onto this nullspace to produce acceleration/G-force estimates in the longitudinal/lateral plane with unknown bearing. At the same time, the means are also projected onto the gravity vectors to produce estimates of the vertical acceleration/G-force component.

Separately, the GPS data is cleaned by removing inaccurate fixes. The GPS data contains both speed and location data. From the speed data, estimates of the G-forces in the longitudinal direction are computed. These longitudinal G-force estimates are typically crude due to latent inaccuracies in the GPS data, but they are used in combination with the longitudinal/lateral acceleration estimates to produce estimates of the orientation of the device with respect to the vehicle. That is, GPS data is incorporated with the accelerometer data to determine the device orientation relative to the vehicle, to determine the forward direction of vehicle movement. Once these orientations are estimated, the acceleration measurements are transformed into the vehicle reference frame to determine longitudinal, lateral and vertical acceleration components. Longitudinal/lateral acceleration data is projected onto the orientations to produce initial estimates of the longitudinal G-forces. Similarly the longitudinal/lateral acceleration data is projected onto the direction orthogonal to the orientation to produce initial estimates of the lateral G-forces. This output is then used to flag periods of unusable data.

Analysis is performed on accelerometer and GPS-fused data to determine if the device orientation is changing relative to the vehicle. If the orientation is changing, other sensor data, such as gyroscope or magnetometer data, is collected and used to update the device orientation.

The GPS speed data is then used to improve the accuracy of the initial longitudinal G-force estimates by correcting for speed drift. After this correction, the longitudinal G-force estimates are finally outputted. Additionally, from the longitudinal G-force estimates, speed estimates are computed by fusing again with the GPS speed data and performing dead reckoning. Dead reckoning determines vehicle speed estimates using GPS data and vehicle acceleration estimates. Note these speed estimates are outputted for all frames in the drive as opposed to the speed data that comes directly from the GPS, which is only outputted during the intervals in which the GPS is turned on. Finally, the route computed using the road geometry data is then fused with the speed estimates to determine the position of the vehicle along the route for each acceleration frame and the overall driving route.

Figure 5:
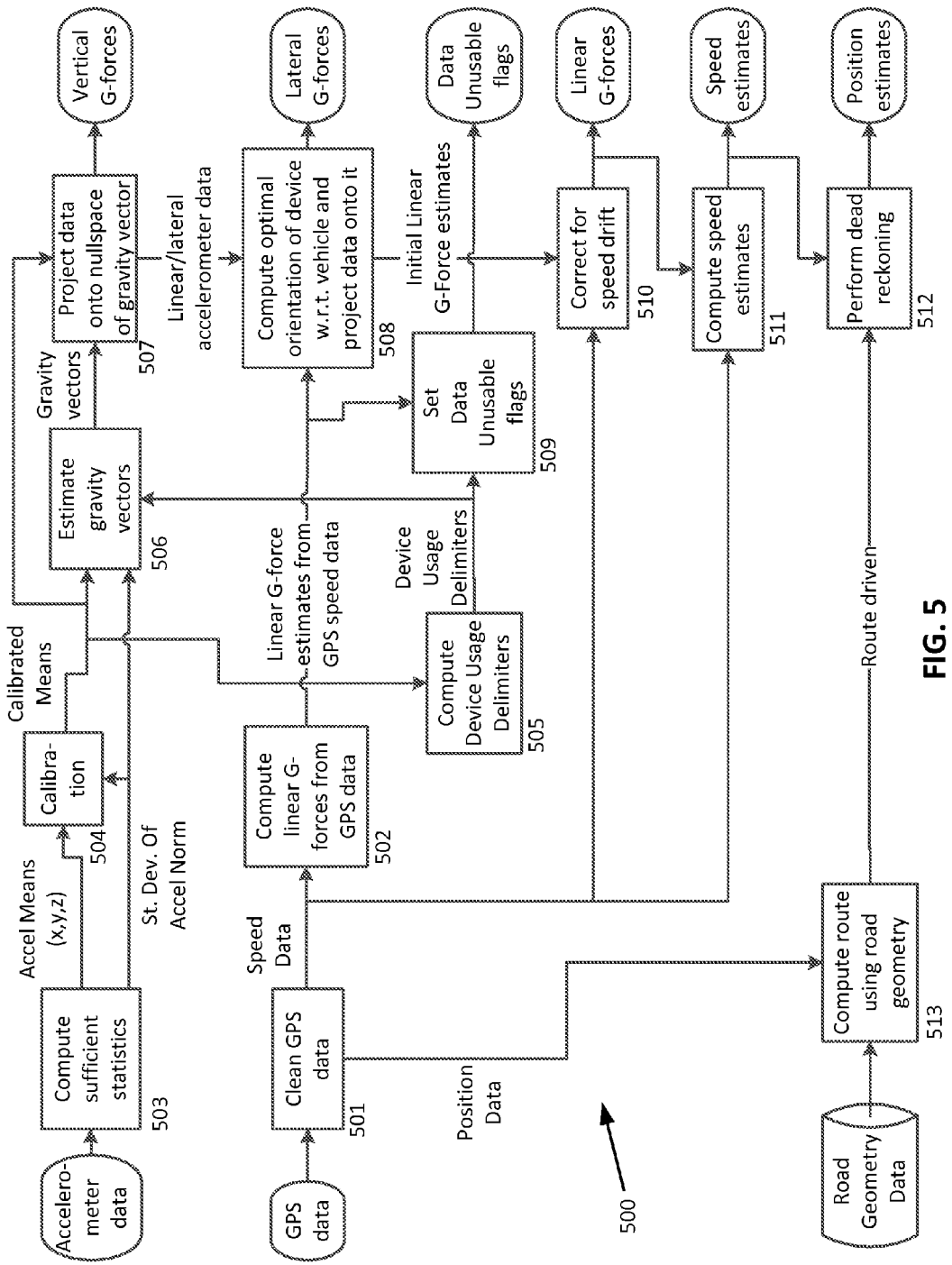
FIG. 5 is an exemplary detailed diagram of a system of the present disclosure.

This system design is summarized in block form in the detailed system diagram 500 of FIG. 5. A description of each component, along with corresponding methods for the components, follows.

Clean GPS Data (501)

Cleaning the GPS data prior to using it, avoids introducing inaccuracies and anomalies that may taint future computation. Some of the techniques that can be used for cleaning GPS data are:

Removing inaccurate fixes. This involves checking the accuracy of each fix and removing those fixes who accuracy exceeds a given threshold, typically 50-150 m.

Removing high speed fixes. This involves checking the speed of each fix and removing those fixes whose speed exceeds a given threshold, typically 200-300 mph.

Removing anomalous fixes. This involves checking the distance between the current fix and the previous fix and dividing by time. If this value exceeds a given threshold (typically 200-300 mph), the fix is removed.

Removing network fixes. This involves removing location fixes that are obtained by the network as opposed to by the actual GPS engine.

Compute Longitudinal G-Forces from GPS Data (502)

Given GPS speed measurements, an estimate of linear G-forces, such as the longitudinal acceleration of the vehicle, can be obtained through filtering. Many filters are viable. One embodiment uses a Savitzky-Golay filter to obtain acceleration estimates from a sequence of speed estimates. This filter has only one parameter: its length N. This value is chosen based on the desired filtering duration of the GPS data, in the range of, for example, 3-5 seconds.

In more detail, if the Savitzky-Golay filter coefficients are denoted $\alpha(i)$ for $i=1, \ldots, N$, with N odd, the longitudinal G-force signal $s(i)$ is estimated from the GPS speed measurements $r(i)$ as $$s(i) = \frac{1}{gF_s} \sum_{j=-(N-1)/2}^{(N+1)/2} \alpha(j+(N+1)/2)(r(i+j))$$

Here $F_S$ denotes the sample rate (typically 1-10 Hz). The dividing factor 9.807 converts from acceleration to G-force.

This approach can also be used to estimate lateral G-forces from the GPS bearing data. This is done by filtering the GPS bearing values as above but also pre-multiplying by the GPS speed values.

Compute Sufficient Statistics (503)

From each frame of accelerometer data, sufficient statistics are computed and stored, and the raw data that was collected from the mobile device is discarded. This greatly reduces the amount of storage space required to hold the raw data in post-processing mode as the typically dozens of samples in each accelerometer frame can be represented by (i) the mean of the acceleration vector and (ii) the standard deviation of the magnitude, also referred to as the norm, of the acceleration vector. Thus, only 4 sufficient statistics calculated from the acceleration vector are required. These are:

$\mu_x$—mean of x-axis accelerometer data in frame
$\mu_y$—mean of y-axis accelerometer data in frame
$\mu_z$—mean of z-axis accelerometer data in frame
$\sigma$—standard deviation of the norm of the accelerometer data in frame Denoting the number of samples per frame as N and the raw accelerometer samples in a given frame as $a_x(t)$, $a_y(t)$ and $a_z(t)$, for $t=1, \ldots, N$, the means are given by $$\mu_x = \frac{1}{N}\sum_{t=1}^{N} a_x(t), \mu_y = \frac{1}{N}\sum_{t=1}^{N} a_y(t), \text{ and } \mu_z = \frac{1}{N}\sum_{t=1}^{N} a_z(t),$$

and the standard deviation of the accelerometer norm is $$\sigma = \sqrt{\frac{1}{N}\sum_{t=1}^{N} \|a(t)\|^2 - \left(\frac{1}{N}\sum_{t=1}^{N} \|a(t)\|\right)^2}$$

where $\|a(t)\| = \sqrt{a_x(t)^2 + a_y(t)^2 + a_z(t)^2}$ is the accelerometer norm at time t. Frames are indexed by i such that for the ith frame the sufficient statistics are $\mu_x(i)$, $\mu_y(i)$, $\mu_z(i)$ and $\sigma(i)$.

If for some reason an insufficient number of samples are logged in a particular accelerometer frame, the sufficient statistics are set equal to the values used in the previous frame. Frames with insufficient data can also be handled in other ways, for example by interpolation of neighboring frames.

Figure 6:
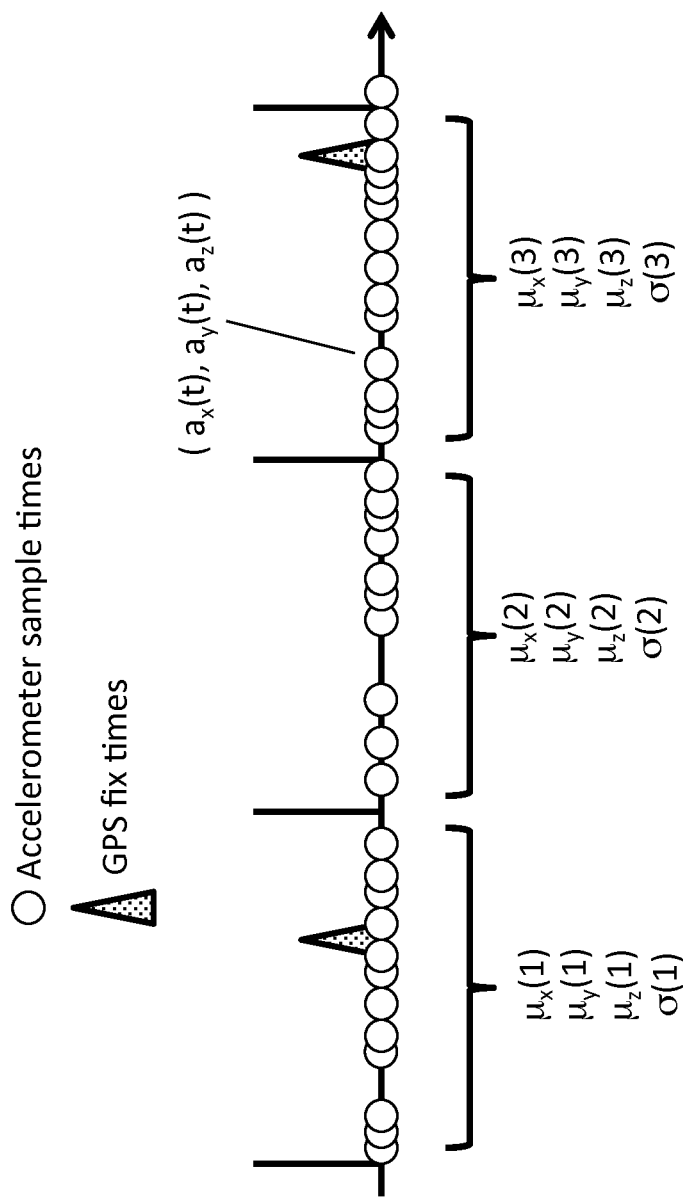
FIG. 6 is an exemplary diagram of a time scale of sufficient statistics.

The time scale of sufficient statistics is illustrated in FIG. 6, showing a time scale of sufficient statistics. FIG. 6 shows three frames, each having accelerometer measurements $a_x(t)$, $a_y(t)$ and $a_z(t)$ taken at multiple times t in each frame. Sufficient statistics are calculated for each frame. For example, in frame 2 the statistics are the means $\mu_x(2)$, $\mu_y(2)$, $\mu_z(2)$ of the individual accelerometer samples in frame 2, and the standard deviation is $\sigma(2)$. FIG. 6 also shows that GPS fixes occur only periodically—twice in the three frames shown.

In addition to the statistics listed, it is also useful to estimate the change in speed and position over each frame:

$dv_x$—change in speed along the device x-axis
$dv_y$—change in speed along the device y-axis
$dv_z$—change in speed along the device z-axis
$dr_x$—change in position along the device x-axis
$dr_y$—change in position along the device y-axis $dr_z$—change in position along the device z-axis
which are given by $$dv_i = \frac{1}{F_s}\sum_{t=1}^{N} a_i(t), \, dr_i = \frac{1}{F_s}\sum_{t=1}^{N} dv_i(t)$$

and $F_s$ is the sampling rate. These measurements are useful for estimating the direction of motion of the vehicle during the drive.

Calibration (504)

Accelerometer sensors typically drift over time. Though the device manufacturer may run their own calibration algorithms on the data from time to time, this calibration may be crude or infrequent. Using uncalibrated accelerometer data can result in grossly inaccurate G-force readings. To counter this, the system performs its own calibration on the accelerometer data.

If the acceleration/G-force data is estimated in post-processing after the conclusion of the trip, then a device calibration may be computed based on motion sensor data collected during the trip. Ideally the best data to use in computing a calibration is data collected when the device is at rest. It is also helpful to use data collected from multiple device orientations. Ideally the data used in calibration should contain one device orientation per parameter used in calibration, e.g. if six parameters are calibrated, six device orientations should be used. To determine which motion sensor data should be used in calibration, a suitability test can be applied. The suitability test should attempt to select data for which there was no device movement. This can be achieved in many ways, for instance, by computing a standard deviation of the accelerometer norm as a measure of device vibration, and selecting only data for which this quantity is below a certain threshold, or selecting data exceeding a certain percentile, e.g. the 10% of the data with the smallest standard deviation.

If acceleration/G-force data is estimated in real-time during the trip, device calibration may be periodically performed through the trip, or once at the beginning of the trip, based on previous data collected. Additionally, data collected in the background before or after the trip may also be used in the calibration procedure.

Background data collection for calibration involves periodically logging motion sensor data throughout the day, performing suitability tests to see if the logged data will be useful for calibration purposes, and if so, storing the data for later use in calibration. For instance, for a segment of logged accelerometer data, the suitability test may involve checking if the device is stationary; for a segment of magnetometer data, the suitability test may involve checking if the device has been moved through a figure-eight or other suitable pattern; for a segment of gyroscope data, the suitability test may involve checking if the device has been rotated.

In some cases sufficient statistics may be immediately computed from raw logged motion sensor data that passes suitability tests, with the raw data discarded, and the sufficient statistics saved for use in later calibration. Thus, calibration of the accelerometer may be performed using the statistics from the acceleration data.

First shall be described how calibration is applied to raw accelerometer data, and then how it can be applied to the sufficient statistics data.

While there are many calibration algorithms in the literature, in one embodiment a highly effective least squares approach is used. This calibration generates six parameters: three scaling factors $K_x$, $K_y$ and $K_z$ and three offsets $b_x$, $b_y$, and $b_z$. Once these parameters have been computed the uncalibrated accelerometer vector $(a_x, a_y, a_z)$ is scaled and offset to produce the calibrated vector $(\bar{a}_x, \bar{a}_y, \bar{a}_z)$ as follows:

$\bar{a}_x = K_x a_x + b_x$      a.

$\bar{a}_y = K_y a_y + b_y$      b.

$\bar{a}_z = K_z a_z + b_z$      c.

To compute the parameters, a recursive algorithm is used. The recursion is initialized with the values $(K_x, K_y, K_z, b_x, b_y, b_z) = (1,1,1,0,0,0)$. The input data is denoted $a_x$, $a_y$ and $a_z$ where each of these variables is a vector containing all the x, y, and z axis accelerometer data in the buffer, respectively. Each iteration of the calibration procedure the following is computed:

$$X = K_x a_x + b_x$$

$$Y = K_y a_y + b_y$$

$$Z = K_z a_z + b_z$$

$$A = [\, a_x.X \quad a_y.Y \quad a_z.Z \quad X \quad Y \quad Z \,]$$

$$b = \frac{1}{2}(9.807^2 + X.X + Y.Y + Z.Z)$$

$$C = \begin{bmatrix} I_{3\times 3} & 0_{3\times 3} \\ 0_{3\times 3} & 0_{3\times 3} \end{bmatrix}$$

$$d = \begin{bmatrix} 1 \\ 1 \\ 1 \\ 0 \\ 0 \\ 0 \end{bmatrix}$$

$$E = \begin{bmatrix} 0_{3\times 3} & 0_{3\times 3} \\ 0_{3\times 3} & I_{3\times 3} \end{bmatrix}$$

$$k = (A^T A + \alpha C^T C + \beta E^T E)^{-1}(A^T b + \alpha C^T d)$$

where x·y indicates element-wise multiplication of x and y, and $I_{3\times 3}$ represents the 3×3 identity matrix. A typical value for $\alpha$ is $10^4$-$10^6$. The six parameters are then read from the vector $k = [K_x, K_y, K_z, b_x, b_y, b_z]$. These parameters are used to initialize the next iteration. A total of, for example, 10-20 iterations are run.

There may be instances where the calibration algorithm fails to converge. This may occur if the input data is degenerate, e.g. if all input accelerometer data has been collected with the device in the same position. In this scenario, calibration is disabled for the trip, i.e. we set $(K_x, K_y, K_z, b_x, b_y, b_z) = (1,1,1,0,0,0)$.

When sufficient statistics are computed and stored instead of raw accelerometer data, the above calibration procedure is instead applied to the stored accelerometer mean statistics. In more detail, in the above calibration procedure the stored accelerometer means $\mu_x$, $\mu_y$, $\mu_z$ are substituted for the accelerometer data $a_x$, $a_y$ and $a_z$, respectively. The computed parameters are then applied to the stored means for each frame $i = 1, 2, \ldots$.

$\bar{\mu}_x(i) = K_x \mu_x(i) + b_x$ $\bar{\mu}_y(i) = K_y \mu_y(i) + b_y$ $\bar{\mu}_z(i) = K_z \mu_z(i) + b_z$ The values $\bar{\mu}_x, \bar{\mu}_y, \bar{\mu}_z$ are referred to as the calibrated accelerometer means. Applying calibration to the standard deviation of the accelerometer norm σ is difficult and tends to have little impact on performance. It can therefore be omitted, i.e. when applying calibration to sufficient statistics, calibration is only applied to the accelerometer means. The standard deviation of the accelerometer norm however is very useful for selecting which data frames to use in calibration, e.g. selecting the 10% of frames with the lowest standard deviation.

The sensor calibration procedure may also be performed periodically before a drive is detected. Throughout the day, when the device is determined to be at rest for a significant period of time (e.g. 1 hour), sensor data collected from the device may be collected and stored for later calibration. The phone calibration procedure is then performed at a later time when movement/drives are unlikely (e.g. 3:00 AM local time) so that real time analysis of the acceleration data during a drive may be achieved. In this case, when accelerometer data is collected during a drive, the calibration parameters are applied to the samples before the sensor statistics (from the above section) are computed.

Compute Device Usage Delimiters (505)

During a drive there may be periods when the movements of the mobile device do not match those of the vehicle: for example, if the device is picked up by the user, or if it goes flying off the passenger seat during a hard brake. Essentially these are periods where the orientation of the device is changing noticeably. The system detects these events in an inverse manner by first identifying those segments for which the orientation the device remains relatively constant. For each such segment a start frame and an end frame are identified. These frames are referred to as delimiters. The data within a set of delimiters is referred to as a coherent block. That is, a coherent block is a set of consecutive frames in which the mobile device stays in the same orientation, the coherent block having start and end points marked by the device usage delimiters. The orientation staying the same is defined as meeting a predetermined threshold or criteria. All frames within these delimiters contain data that is likely accurate and usable for computing vehicular G-forces. All frames outside of delimiter pairs are flagged as unusable.

Identifying the correct start and end delimiters for each coherent block using the accelerometer data is complicated by the fact that the accelerometer data for a hard braking, accelerating, or cornering maneuver looks very similar to the accelerometer data for a sudden change in orientation. The key difference is that at the conclusion of a hard vehicular maneuver, the accelerometer data will return to its original orientation state, whereas at the conclusion of a change in device orientation (e.g. user picks up phone to look at screen) the accelerometer data will be in a new orientation state. The system exploits this distinction to differentiate between true changes in orientation, and hard maneuvers by the vehicle. This is done using a similarity matrix technique.

Figure 7:
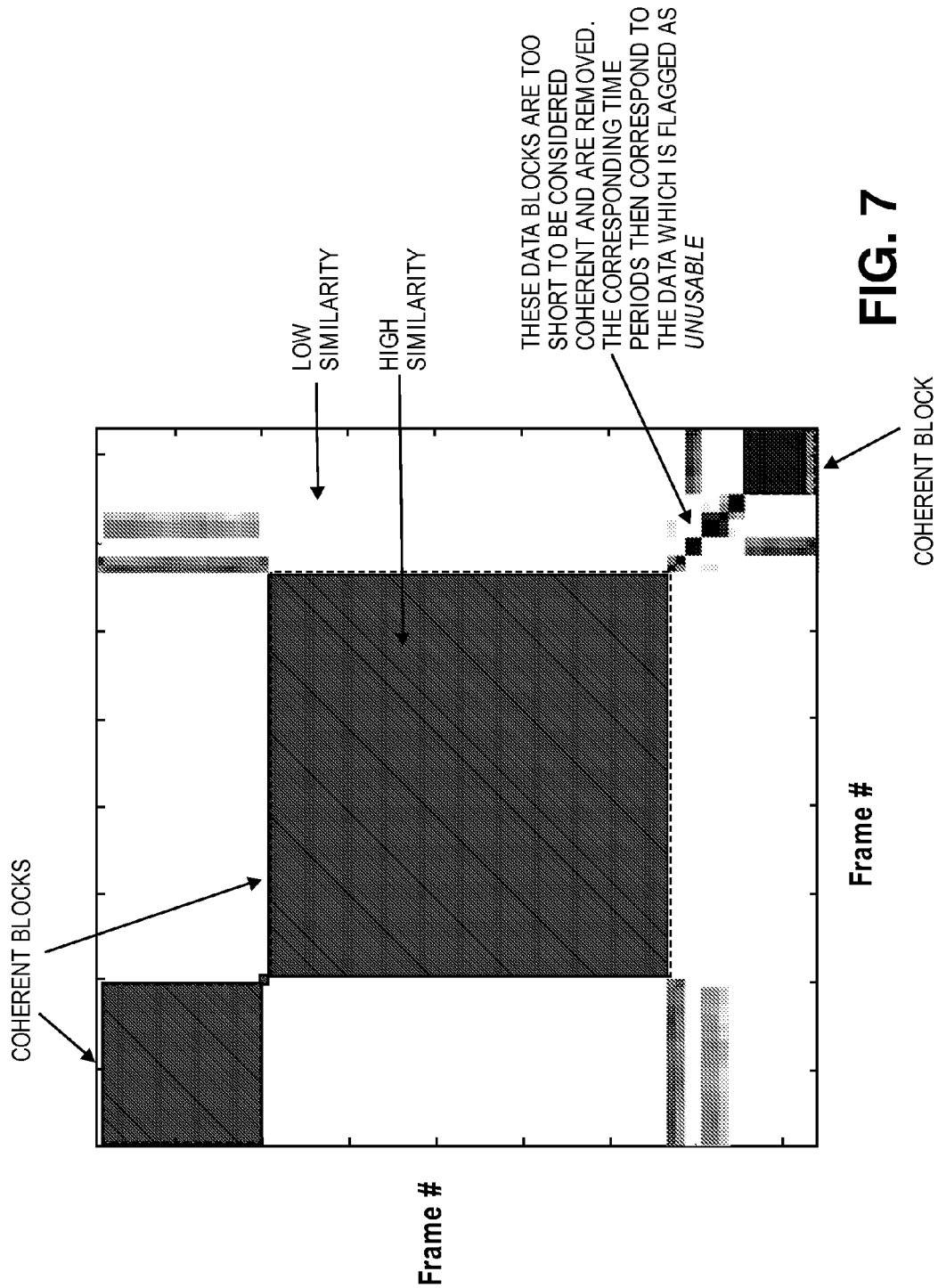
FIG. 7 is an exemplary diagram of a processing similarity matrix.

The similarity matrix technique finds the start and end delimiters for each coherent block of data. The similarity matrix itself is computed from the calibrated accelerometer means. It consists of one similarity metric for each pair of calibrated accelerometer mean vectors, which describes the degree of similarity between them. Once formed, the matrix is swept through to find coherent blocks of similarity which represent the same coherent device orientation. Once a frame is reached that delineates between a previous coherent block and a new block, an end delimiter is set for the ending frame and a new start delimiter is set for the starting block. This procedure repeats until the end of the matrix is reached. A clean-up then occurs where blocks with duration less than a certain threshold are removed. The predetermined threshold may be, for example, at least 3-5 frames in which the device is in the same orientation. These very short blocks correspond to periods where the device orientation is in a state of flux. The removed blocks will ultimately correspond to the segments of data that are flagged as unusable. The technique is illustrated in FIG. 7, which illustrates an exemplary processing similarity matrix to find device usage delimiters. Dark pixels correspond to pairs of frames with high similarity, light pixels correspond to a pairs of frames with low similarity. Coherent blocks that have been detected are outlined in dashed lines. Data blocks that are too short to be considered coherent—that is, blocks that are incoherent—are removed. The corresponding time periods then correspond to the data which is flagged as unusable. The orientation of the device during incoherent blocks can be analyzed and/or calibrated using additional sensor data other than accelerometer data. For example, a changing rotation matrix may be determined by incorporating sensor measurements provided by the device's magnetometer or gyroscope, as described elsewhere in this disclosure.

In one embodiment, the similarity metric is the normalized inner product of the acceleration vectors in adjacent frames i and j, using the mean values:

$$m(i, j) = \frac{\bar{\mu}(i)^T \bar{\mu}(j)}{\|\bar{\mu}(i)\|\|\bar{\mu}(j)\|}$$

The computation of the coherent blocks of sensor data can be done in real time by comparing a new frame of sensor data to the statistics of several previously corrected frames. If the device orientation has not changed significantly over the course of these frames, they are part of the same coherent block. In other words, it is determined whether the similarity metric meets a predetermined critera. For example, a similarity metric value m(i,j) that is close to 1, such as meeting a predetermined criteria of being at least 0.9, or from 0.9-1.0, indicates that the frames are coherent. A value of m(i,j) of exactly 1 indicates that the orientations of the acceleration vectors in the two frames are aligned; a value of zero indicates that the orientations are perpendicular to each other; and a value of −1 indicates that the orientations are in opposite directions.

During a drive, when it has been determined that the device orientation has been changed (i.e. a delimiter has been set denoting the end of a coherent block), the new device orientation can be updated using sensor data that provides rotational measurements, such as provided by the gyroscope and magnetometer sensors. The gyroscope sensor provides more accurate measurements and is used as the sensor to provide the data for rotational measurements, in one embodiment. Thus, for incoherent blocks, other sensor data from the mobile device, such as gyroscope or magnetometer data, may be used in addition to the accelerometer data to compute the orientation of the mobile device.

Estimate Gravity Vector (506)

There are many ways to estimate the gravity vector. A common technique is to apply a moving-average filter to the accelerometer data. The moving average filter has a time constant that determines the duration of data to average over. This can be optimized for performance. The filter may also weight accelerometer samples according to certain criteria. For example, the samples may be weighted according to a short-term estimate of the amount of device movement. Such an estimate may be derived from a quantity such as the standard deviation (or variance) of the accelerometer norm. The rationale for increasing the weighting of accelerometer samples with low device movement is that these samples are least likely to contain forces other than gravity. A similar technique for estimating the gravity vector is to find periods of no device movement and estimate the gravity vector by averaging only the accelerometer data collected during these.

The system estimates the gravity vector from the calibrated accelerometer means aided by the standard deviation of the accelerometer norms. The calibrated accelerometer means are averaged over a window of width W frames. When the system operates in real-time mode, the window extends backward in time by W frames. When the system operates in post-processing mode the window extends both backwards and forwards by W frames. The frames in the window are exponentially weighted according the standard deviations such that frames with smaller standard deviation are given larger weightings and vice versa. That is, estimating a gravity vector may include summing the mean accelerometer values over a window of frames, where the mean accelerometer values are exponentially weighted according to the standard deviation of the accelerometer norm of the corresponding frames, and where smaller standard deviations are given larger weightings. When the device orientation is fixed, a larger value of W will result in a more accurate estimate of the gravity vector. In particular, it helps smooth out the effects of vehicle acceleration which can generate bias. In practice however, the device orientation is not fixed: it either drifts over time, or can change slightly due to movements of the user (e.g. if the device is in the right pant pocket of the driver and shifts around slightly as they move their foot between the accelerometer and brake pedals). In these situations, if W is too large, the gravity vector can be biased. In practice, a value of W corresponding to, for example, 30-180 seconds of frames works well.

In more detail, in post-processing mode the gravity vector is computed as $$g(i) = \frac{1}{K(i)} \sum_{j=i_s}^{i_e} \alpha(j) \bar{\mu}(j)$$

where $i_s = i - W$ and for post-processing mode $i_e = i + W$, and for real-time mode $i_e = i$. and where $$\bar{\mu} = [\bar{\mu}_x, \bar{\mu}_y, \bar{\mu}_z]^T$$

with weights $$\alpha(j) = \exp(-A\sigma(j))$$

And the normalization constants $K(i) = \Sigma_{j=i-W}^{i+W} \alpha(j)$. The constant A determines the impact the standard deviation of the accelerometer norm has on the computed gravity vectors. Typical values are in the range of, for example, 0.5-5.

Figure 8:
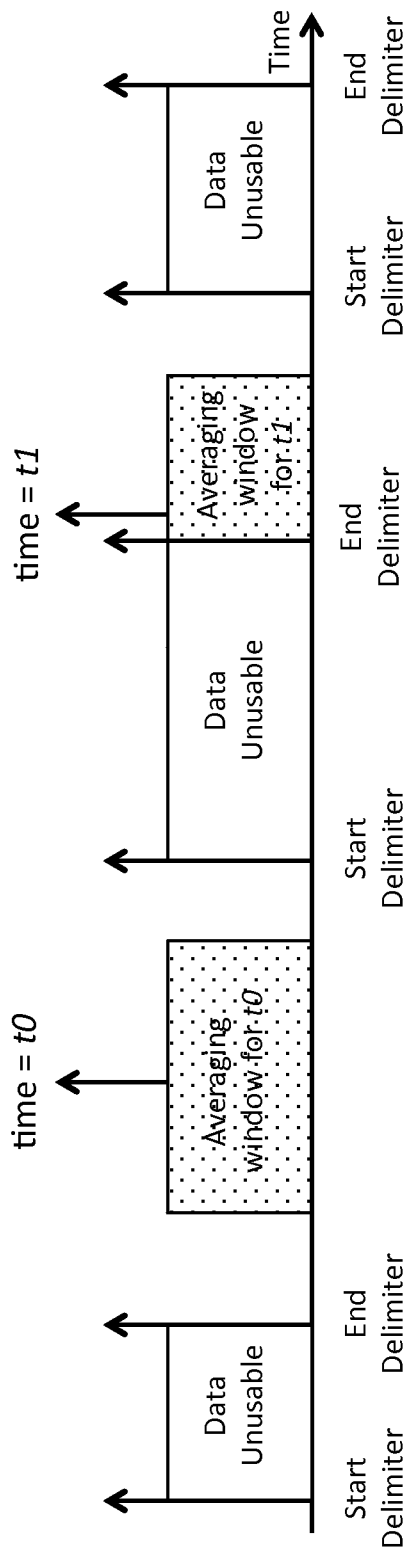
FIG. 8 is an exemplary diagram showing use of delimiters.

The device usage delimiters (see block 505 of FIG. 5) can be used to improve the performance of the gravity vector estimation. This is done by limiting the window over which gravity vectors are averaged, to not include data containing device usage. An improved approach extends the window outward from the current frame, up until a device usage delimiter is hit. That is, the gravity vector is estimated using the statistics from the accelerometer data in coherent blocks. Estimating the gravity vector excludes incoherent blocks, where an incoherent block is a set of consecutive frames in which the similarity metric fails to meet the predetermined criteria (e.g., a criteria of at least 0.9), and where the incoherent block has a duration less than a predetermined threshold. This prevents the gravity vector from being averaged over segments of data where the device orientation is changing. For example, suppose the user picks up the device at frame 50, significantly changing its orientation from frame 50 on. When estimating the gravity vector at frame 47 with window size W=10 frames, the window will extend from frame 37 to frame 49, instead of from frame 37 to frame 57. This prevents the data in frames 50 on from biasing the gravity vector computed at frame 37. The approach is illustrated in FIG. 8, showing use of delimiters to determine which motion data to average over. In the example of FIG. 8, the averaging window at time t0 is not restricted due to delimiters, but the averaging window at time t1 is restricted due to the previously occurring end delimiter.

Project Data onto Nullspace of Gravity Vector (507)

After computing the gravity vectors, their nullspaces are computed from the gravity vector, and the calibrated accelerometer means are projected onto these. Projecting the accelerometer data onto the nullspace results in an estimated orientation of the mobile device in the vehicle, from which a forward direction of the vehicle movement can be provided. The nullspace of the gravity vector is the plane orthogonal to the gravity vector. If the road is level, then this plane will be the plane of the road. By projecting the calibrated accelerometer means onto this plane, the longitudinal and lateral component of acceleration can be separated from the vertical component.

The null space for frame i can be computed explicitly as $$n_x(i) = K_1 \begin{bmatrix} g_x(i)g_z(i) \\ g_y(i)g_z(i) \\ -g_x(i)^2 - g_y(i)^2 \end{bmatrix}$$

$$n_y(i) = K_2 \begin{bmatrix} g_y(i) \\ -g_x(i) \\ 0 \end{bmatrix}$$

where $K_1$ and $K_2$ are chosen such that $\|n_x(i)\|=1$ and $\|n_y(i)\|=1$. The longitudinal/lateral accelerometer data is $$l_x(i) = n_x(i)^T \bar{\mu}(i)$$

$$l_y(i) = n_y(i)^T \bar{\mu}(i)$$

and the vertical acceleration is $$a_{vertical}(i) = g(i)^T \bar{\mu}(i)$$

Compute Optimal Orientation of Device and Project Data onto it (508)

To obtain the longitudinal and lateral G-force estimates from the longitudinal/lateral accelerometer data, the orientation between the device and vehicle needs to be known. Projecting longitudinal/lateral data onto the wrong orientation results in confusion between longitudinal and lateral G-forces, i.e. cornering is confused with braking/accelerating and vice versa. The estimated orientation of the mobile device with respect to the vehicle is improved by cross-correlating the longitudinal/lateral accelerometer data with the longitudinal G-forces estimates from the GPS data. The longitudinal and lateral of the accelerometer data are obtained from the accelerometer data that is projected onto the nullspace, as described in the previous section. The rationale behind this is that if the longitudinal/lateral accelerometer data is projected onto the correct orientation, the resulting signal will be a scaled version of the longitudinal G-force signal derived from the GPS data, i.e. the correct orientation results in maximum cross-correlation.

This can be formulated as an optimization problem as follows. The cross-correlation between the longitudinal G-force estimates s(j) derived from the GPS data and the longitudinal/lateral accelerometer data $l_x(j)$, $l_y(j)$ projected onto an orientation defined by unit vector $h(i)=[h_x(i)\ h_y(i)]^T$ is $$\rho(i) = \sum_{j=i-W}^{i+W} s(j)(h_x(i)l_x(j) + h_y(i)l_y(j))$$

for frame i. For each frame i we wish to solve $$\sum_{\substack{h(i) \\ s.t.\ \|h(i)\|^2 = 1}} \rho(i)$$

For simplicity we drop the i notation. This is a convex optimization problem which can be solved by writing the Lagrangian $$L(h_x, h_y, \lambda) = \sum_{j=i-W}^{i+W} s(j)(h_x(i)l_x(j) + h_y(i)l_y(j)) - \lambda_x h_x(i)^2 - \lambda_y h_y(i)^2$$

and setting its partial derivatives to zero. The solution is $$h_x = \frac{\pm \sum s(j)l_x(j)}{\sqrt{(\sum s(j)l_x(j))^2 + (\sum s(j)l_y(j))^2}} \text{ and}$$

$$h_y = \frac{\pm \sum s(j)l_y(j)}{\sqrt{(\sum s(j)l_x(j))^2 + (\sum s(j)l_y(j))^2}}$$

where the ± signs for $h_x$ and $h_y$ can be chosen by evaluating the cross-correlation for each of the four possible sign combinations and selecting the one with the highest result.

One of the key benefits of the above approach is that by formulating the problem as a convex optimization problem, the optimal orientation can be expressed analytically and hence evaluated with minimal processing.

The initial longitudinal acceleration estimate for the ith frame is then computed as $$a_{linear}(i) = h_x(i)l_x(j) + h_y(i)l_y(j)$$

and the lateral estimate is $$a_{lateral}(i) = -h_y(i)l_x(j) - h_x(i)l_y(j)$$

The window size radius W can be chosen similarly to the manner it is chosen based on the gravity vector computation; one embodiment uses the same value of W.

Figure 9:
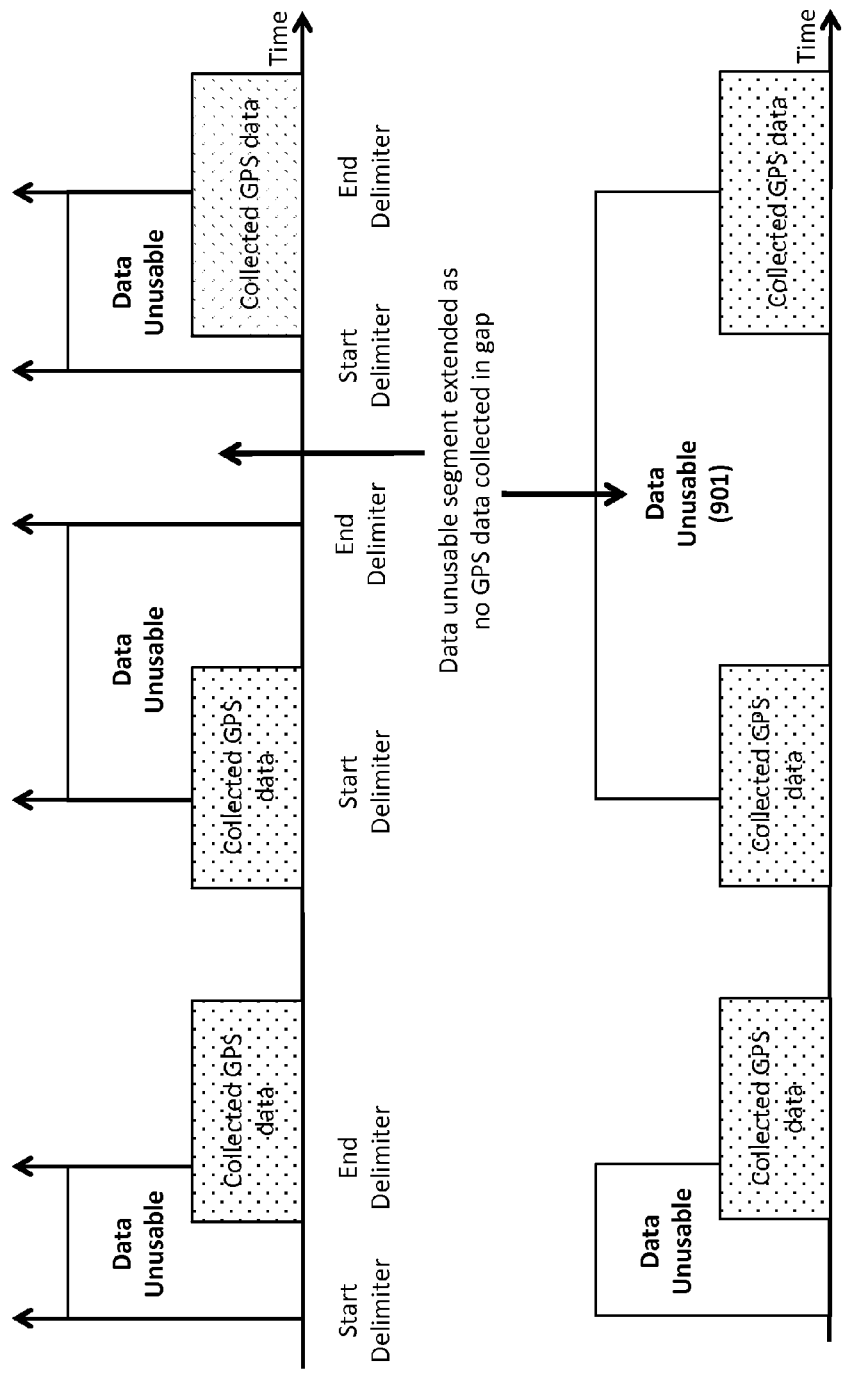
FIG. 9 provides exemplary diagrams showing data unusable segments.

Also similarly to the computation of the gravity vector, the window over which the cross-correlation is chosen is restricted based on the device usage delimiters. This is illustrated in FIG. 9, demonstrating that segments with no collected GPS data are also flagged as unusable. Thus, data unusable flags are set for frames that are delimited as incoherent blocks, or that have insufficient longitudinal G-force GPS data. The rationale is the same as for the gravity vector. It is important to isolate those periods during which the device orientation remains constant.

Set Data Unusable Flags (509)

The system determines which frames are unusable from a data accuracy standpoint by combining the information from the device delimiters and the longitudinal G-forces from the GPS data. This is initially done by flagging all frames that are delimited due to device usage as unusable. Additionally, frames with either little longitudinal G-force GPS data, or longitudinal G-force GPS data that is small in magnitude are also likely to lead to inaccuracy and are flagged as unusable. To see why this is advantageous, consider the correlation ρ(i). When the longitudinal G-force data from the GPS is close to zero, i.e. s(j)≡0, for j=i−W, . . . i+W, then ρ(i)=0, and all orientations will give the same cross-correlation. In this case we cannot determine the optimal orientation with any degree of accuracy. These frames can be flagged in numerous ways, for instance, by flagging all frames for which the maximal cross-correlation in below a certain threshold. Alternatively frames may be flagged as unusable based on having an insufficient number of GPS-based longitudinal G-force samples in the window [−W, W]. This is illustrated in FIG. 9, showing a data unusable segment 901 that is extended in the lower graph, since no GPS data was collected in the gap between the delimited data unusable areas of the upper graph.

Correct for Speed Drift (510)

A simple technique to improve the accuracy of the longitudinal, lateral and vertical G-force estimates, is to set these equal to zero when the vehicle is stationary. Detecting that the vehicle is stationary can be done in numerous ways. For instance, if a segment of the longitudinal G-force signal exhibits little deviation in its value for a prolonged period of time, but is offset from zero, this may indicate the vehicle is stationary but the gravity vector is poorly estimated, in which case the longitudinal, lateral and vertical G-force values within the segment can be set to zero to correct this problem. A simpler approach is to leverage the GPS speed data. If the GPS speed data is zero, indicating the vehicle is stationary, the corresponding segments of longitudinal, lateral and vertical G-forces can be set to zero.

An additional way to determine if the vehicle is stationary is to use the location values provided by the GPS data. Using these, the distance traveled over the course of the GPS data collection can be determined. If the distance is sufficiently small (for instance, if the locations are all within the accuracy limits of the other samples as reported by the GPS data), then the vehicle is not changing position and can be considered to be stationary. Thus, speed drift can be corrected for by (a) identifying periods of time when the vehicle is stationary, based on GPS position values, and (b) setting G-force values to zero for those periods.

Compute Speed Estimates (511)

If GPS speed data is collected continuously throughout the drive, the longitudinal G-force estimates can be used to improve the accuracy of these speed estimates.

If the system collects only short segments of GPS speed data during the drive (e.g. 15 sec of GPS data every 60 sec), speed estimated during times when the GPS speed data is not available can be obtained using the longitudinal G-force estimates. This is done by essentially integrating (i.e. summing) the longitudinal acceleration values over the missing intervals. If GPS speed values exist at two separate anchor points with no GPS speed values in between these, speed estimates can be interpolated between the two points with the aid of the longitudinal acceleration values by integrating them and then applying a linearly increasing bias to ensure speed estimates match at the anchor points. If any data is flagged as unusable, the corresponding longitudinal acceleration values can be set to zero for the purposes of estimating speed. Thus, vehicle speed estimates involve calculating vehicle speed estimates for intervals between the segments of collecting GPS data. The speed estimates are interpolated for an interval between GPS time segments, by integrating longitudinal acceleration data over the interval, where the longitudinal acceleration data is relative to the nullspace.

In some embodiments, interpolating the speed of the vehicle involves computing a cumulative sum of a plurality of longitudinal acceleration estimates, and adding the cumulative sum to the initial speed data point. A bias offset is computed between the final value of the cumulative sum and the initial speed data point. A plurality of values is subtracted from the plurality of longitudinal acceleration estimates, such that the sum of the plurality of values equals the bias offset.

A similar approach can be used to estimate vehicle bearing. In this case the lateral G-force signal is multiplied by the speed and integrated between obtained GPS bearing values, with a bias computed and applied to ensure a seamless transition between the computed estimates and the GPS bearing values.

Perform Dead Reckoning (512)

By collecting GPS data continuously throughout a drive, the route driven can be plotted on a map as a sequence of location fixes. Although this approach provides a location estimate for the vehicle at each sample time throughout the drive, the location estimate may be inaccurate due to inaccuracies in the GPS fixes. If the GPS fixes are inaccurate, this could result in a sequence of data points lying on an incorrect neighboring road. Additionally, this approach is extremely power consumptive, as the GPS engine will be on for the entire duration of the drive.

The speed estimates computed in the previous block 511 can be fused with the route driven (as defined by road geometry) to produce estimates of the location of the user at each sample time, with respect to the road geometry. That is, vehicle position can be estimated by fusing the vehicle speed estimates with route and road geometry information. As the system produces these estimates by turning the GPS on for only a small fraction of the drive, this approach provides a precise location history of the user with little energy consumed. This process is referred to as dead reckoning. A route taken by the vehicle is computed using the estimated vehicle positions and the road geometry information. The position of the vehicle is interpolated during segments of time in which position data is not collected on the mobile device, using the vehicle speed estimates, the estimated vehicle positions, and the computed route taken by the vehicle. Interpolating the position of the vehicle can include finding points on the computed route associated with each interpolated position, and interpolating the distance of the vehicle along the route, between the found points.

The route driven can be computed with the aid of road geometry using the techniques described in section "Inferring a drive route from sparse location fixes using a driving directions AP". This corresponds to the "Compute route using road geometry block" 513 in FIG. 5. The output of this block is a sequence of latitudinal/longitudinal coordinates that represent the start and end points of each segment of the route. This is a piecewise longitudinal representation of the underlying road geometry. This is illustrated in FIGS. 10A-10B, showing two examples of sequential latitudinal/longitudinal coordinates, shown as open circles in the figures, that represent the start and end points of each segment of the route.

Aside from being able to associate at each sample time, a precise location for the user on the route driven, by using this technique it is also able to associate events such as Hard braking, accelerating, left cornering, right cornering Calls placed or received, SMS messages sent Device handling (i.e. holding the device in hand)

Device usage (i.e. turning the screen on to view information)

Foreground app usage (i.e. which app is in the foreground)

Speeding events with precise locations on the route. This is illustrated in FIG. 11, which shows a route 1100 having a start point "S" and end point "E", where events 1101, 1102, 1103 and 1104 are associated with precise locations on the route 1100 using dead reckoning.

Figure 12:
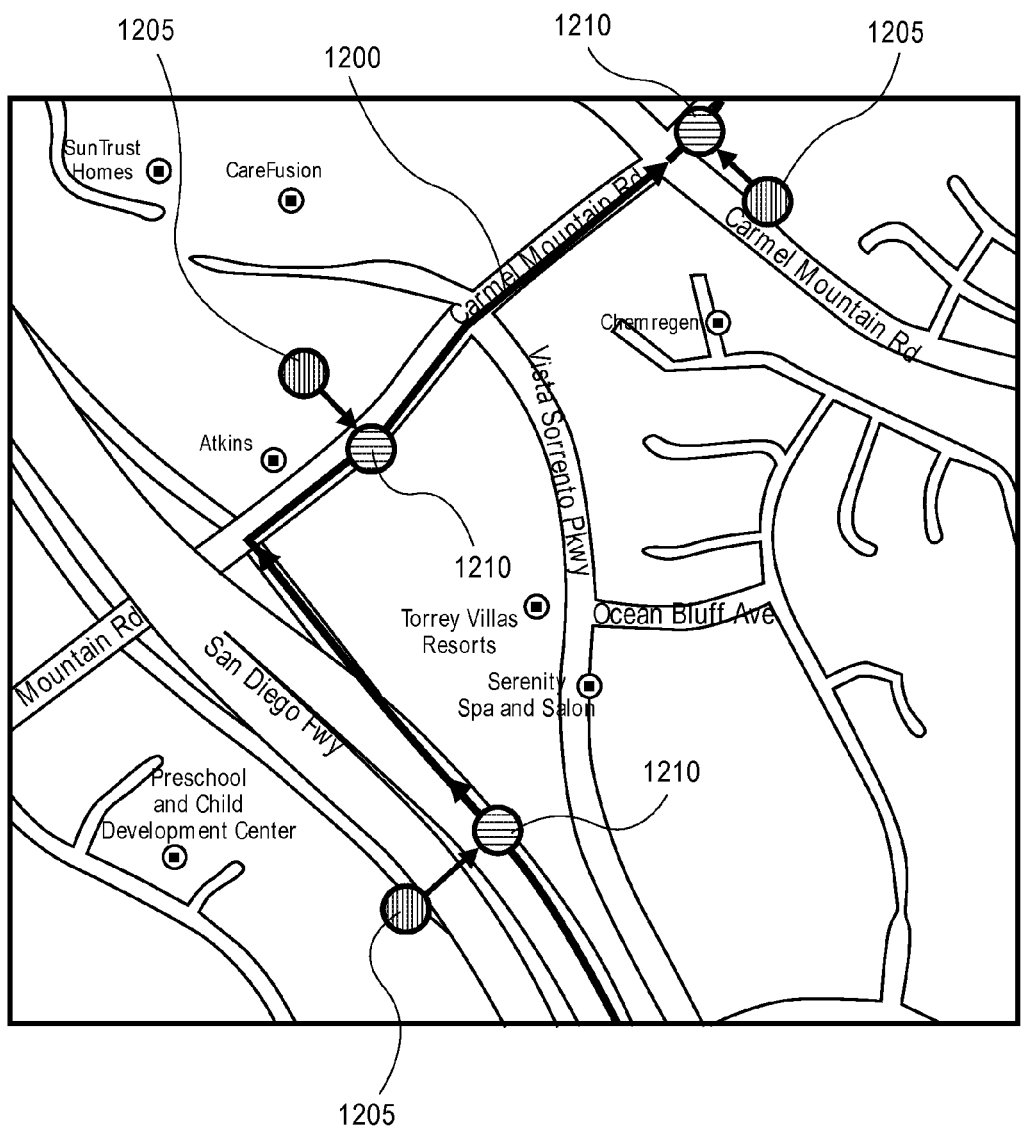
FIG. 12 is an example of pinning GPS locations to a route.

The basis of the dead reckoning technique is to integrate the speed estimates over the length of the trip, in a manner analogous to the way in which longitudinal acceleration estimates are integrated over the duration of the trip to produce the speed estimates. Analogously to how GPS speed values are used as anchor points when interpolating speed estimates utilizing longitudinal acceleration, GPS locations can be used as anchor points when interpolating location estimates utilizing speed estimates. The difference here is that the GPS locations need to be pinned to the route so that each can be associated with a distance driven. This is illustrated in FIG. 12, where each GPS location 1205 is pinned to a point 1210 on the route 1200 so that it can be associated with a distance driven along route 1200.

Figure 13:
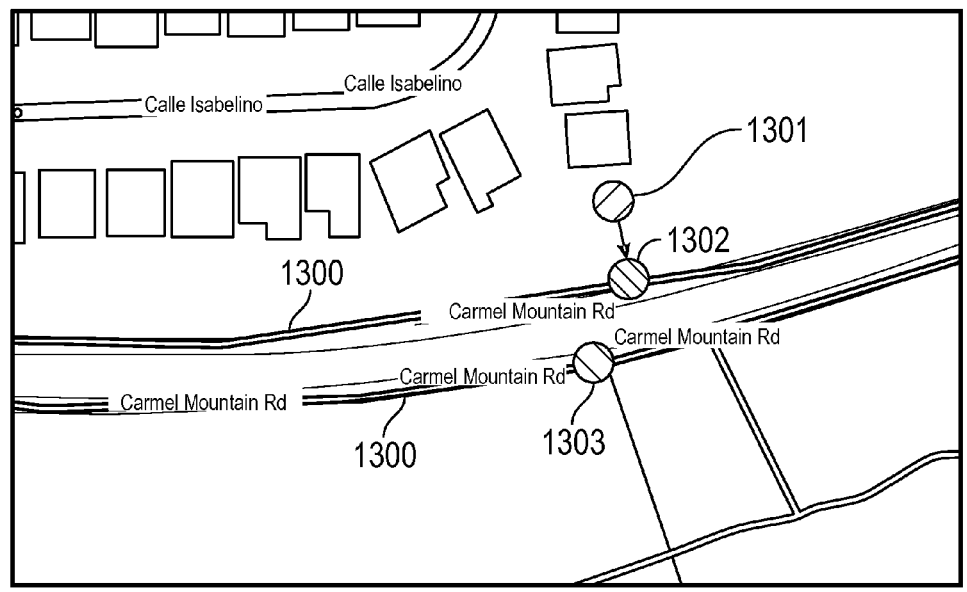
FIG. 13 shows an example of an in accurate GPS fix.

Pinning GPS locations to the route is not a straightforward problem. If the locations are merely associated with the nearest point on the route, confusion will occur in certain scenarios. For instance, if the user drives up a divided road in one direction and later drives back down the same road in the opposite direction, then inaccurate GPS fixes may end up being pinned to the wrong side of the road, and hence the wrong segment of the route. This problem is illustrated in FIG. 13. If the user drives up a divided road in one direction and later drives back down the same road in the opposite direction, then inaccurate GPS fixes may end up being pinned to the wrong side of the road compared to the true location, and hence the wrong segment of the route. For example in FIG. 13, the location of a GPS fix 1301 is pinned to location 1302, which is the nearest point on the route 1300. However, location 1302 is on the wrong side of the road, since the true location is location 1303.

Figure 14:
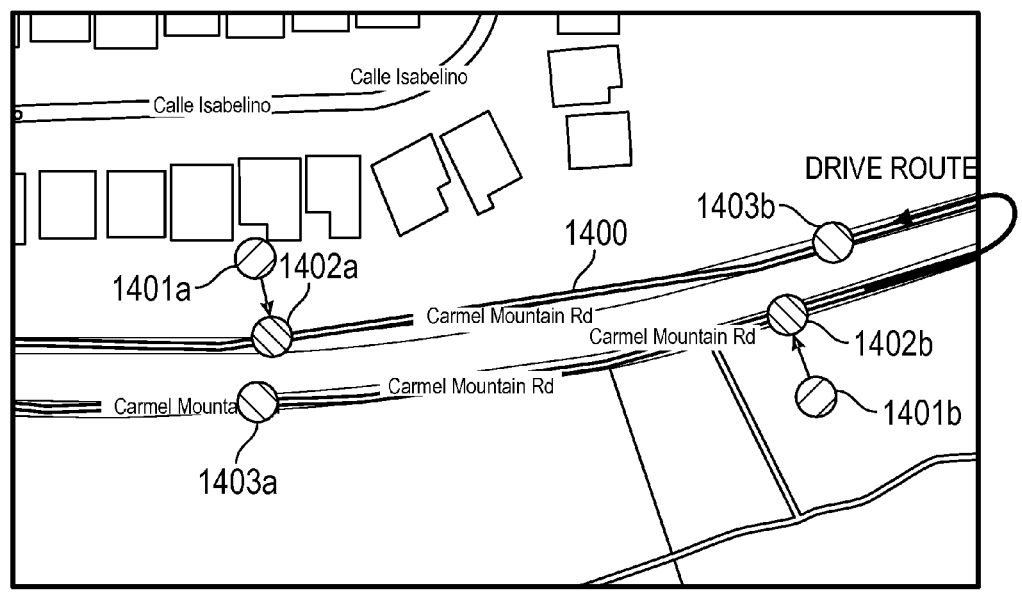
FIG. 14 shows an example of a GPS location being associated with an earlier position on a route.

Another problem occurs if a noisy GPS location results in a later fix being associated with an earlier position on the route. This would incorrectly imply the user drove backwards. Such behavior could occur when the vehicle is stationary. This problem is illustrated in FIG. 14, showing a route 1400 in which the vehicle performs a U-turn to return along the opposite side of the road. Route 1400 has first and second true locations 1403a and 1403b, along with first GPS location fix 1401a associated with the first location 1403a and second GPS location fix 1401b for the second location 1403b. Pinned point 1402a results from with first GPS location fix 1401a, and pinned point 1402b results from second GPS location fix 1403b. If the second GPS location 1401b is inaccurate, second pinned point 1402b, can be incorrectly pinned to an earlier position in the route 1400 than the first GPS location 1401a. That is, in FIG. 14 the second pinned point 1402b incorrectly occurs earlier in route 1400 than the first pinned point 1402a. Instead, the true location 1403a occurs earlier on the route than the second true location 1403b.

The system of the present disclosure solves these problems in two steps.

First, from the set of GPS location fixes obtained throughout the drive, it flags only a handful to pin to the route to be used as anchors for position interpolation. These points are selected so that they are sufficiently far apart in time, distance and/or another dimension. For instance, the system may pin only every $10^{th}$ GPS fix obtained, or pin GPS fixes separated by at least 200 meters. In one embodiment the procedure is to only flag the start and end GPS fix of each wake up period. For example, if the system wakes for 15 seconds every minute and obtains GPS fixes every second for this period, only the first and last fixes in each period are flagged to be pinned to the route.

Figure 15:
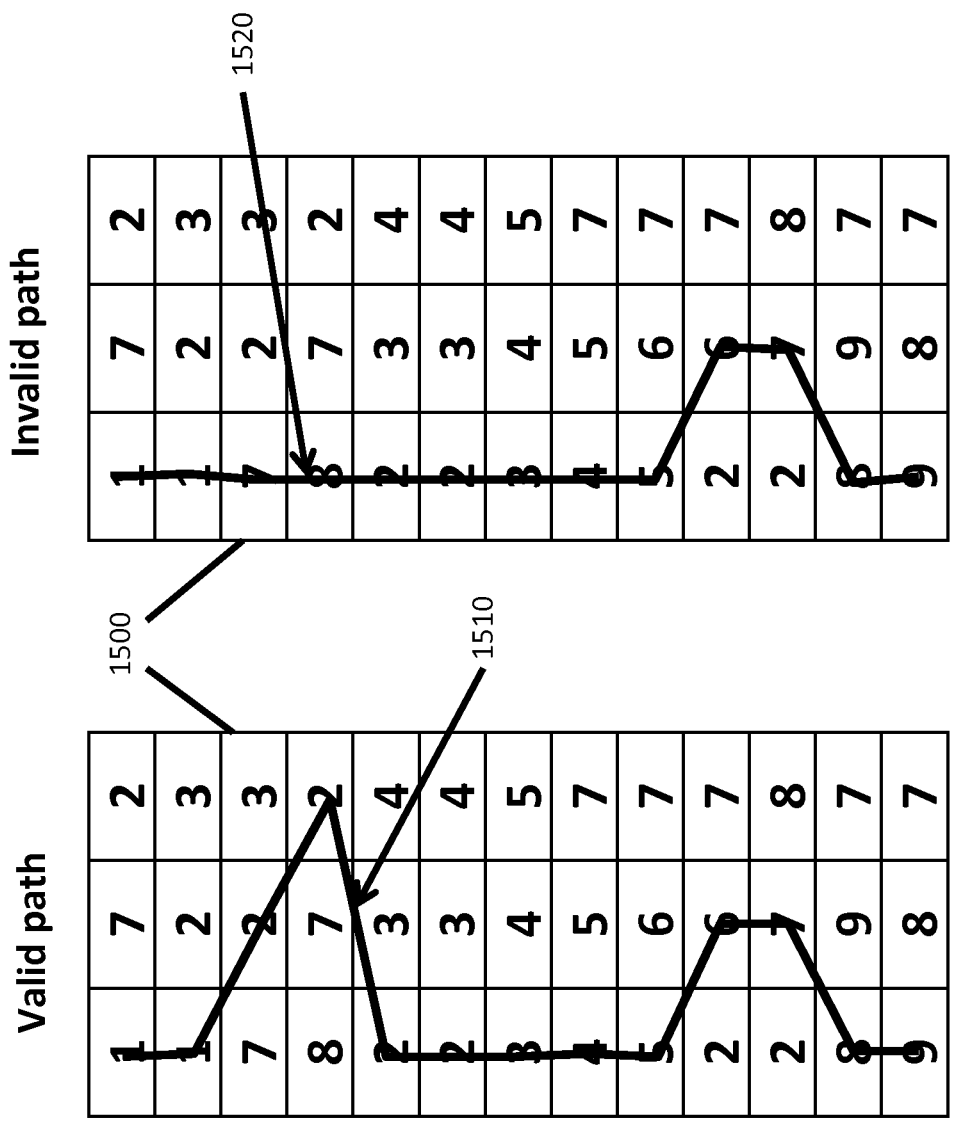
FIG. 15 provides sample diagrams of determining road segment paths for GPS location fixes.

Second, once a set of GPS location fixes has been flagged for being pinned to the route, the problem becomes correctly associating each fix with the road segment on which it occurred, as once the correct road segment is identified each flagged fix can simply be pinned to the nearest point on the segment. The key to doing this is to respect the order in which the flagged fixes occurred. For each fix, a most likely ordering of road segments from which a fix originated can be identified, based on the distance of the fix from these road segments: the nearest road segment being most likely, the furthest being least likely. Given the accuracy value associated with the GPS fix, there are only a small number of candidate road segments it likely could have come from. For example, if the accuracy of the GPS fix tells us the true location lies within 100 m of it with very high probability, then the only likely candidate road segments are those that lie within 100 m. The problem can then be easily simplified by considering only the K nearest road segments as candidates for each fix. Each of these candidate road segments can then have a cost associated with them, which is ordered such that the closest road segment has the lowest cost, and the furthest has the highest. Alternatively a probability measure can be associated with the distance of the nearest point on the road segment to the fix and the cost values set commensurately with this distribution. If there are N flagged fixes, one N×K array can be formed where each row contains the K closest road segments. The problem then boils down to finding the minimum cost path that traverses the array from top to bottom, touching only one road segment per row, such that the sequence of road segments touched is non-decreasing, i.e. for each road segment in the path, no subsequent road segment occurs before it. This is illustrated in FIG. 15, showing a road segment array 1500 and valid path 1510 and invalid path 1520 that traverse it. Path 1520 is invalid because road segment 8 precedes earlier road segment 2.

A dynamic programming solution can then be employed to solve this problem. This is done by implementing a standard solver for the shortest path problem with the cost of any candidate road segment that precedes a previous segment, set to infinity.

In more detail, denote the flagged fixes $x_1, \ldots, x_N$. For each $x_i$ identify the K nearest road segments and place these into the ith row of the road segment array $L_{ij}$, ordered by distance from smallest to largest. One embodiment associates costs of 0 to K−1 with the K nearest road segments. A cost array $C_{ij}$ is formed by traversing the road segment array $L_{ij}$ in order of increasing i, at each step filling in entry $C_{ij}$ with cost $C_{i-1,j}+j-1$ if $L_{i-1,j} \leq L_{i,j}$, and cost ∞ otherwise. This is illustrated in FIG. 16, where the cost of the minimum cost path arriving at (i,j) is the minimum of the costs of the minimum cost path arriving at (i−1,j), plus the cost of traversing from (i−1,j) to (i,j) in the road segment array, which is infinite if the road segment in (i,j) precedes the road segment in (i−1,j). For example, in FIG. 16 the path directly from $C_{3,1}$ to $C_{4,3}$ is invalid since road segment 7 of $C_{3,1}$ precedes road segment 3 of $C_{4,3}$.

Thus, dead reckoning can include finding points on the route by computing a plurality of nearest route segments and associated distances, for each position value. An optimal path of route segments is computed such that each route segment is associated with one position value, and such that if a first position value is obtained from an earlier segment of time than a second position value, then the route segment associated with the first position value occurs earlier in the route than the route segment associated with the second position value. Each position value is pinned to the nearest point on its associate route segment.

Once the correct road segment for each flagged fix is identified, the fix is pinned to the nearest point on this road segment. The cumulative distance along the route for each of this pinned fixes is computed. These serve as distance anchors. The speed estimates are then interpolated between these distance anchors with the aid of the speed estimate values by summing them and then applying a bias to ensure the cumulative distance values at each sample time match at the anchor points.

Real time dead reckoning analysis can be used to better pin GPS data to a drive route. For instance, if the driving route has been determined for a drive up to a given GPS fix, this last fix can be pinned to the map such that it bests continues the determined route. To do this, the accelerometer sensor measurements may be used to monitor significant changes in driving direction (e.g. has the vehicle turned left/right, started driving in reverse, etc.). If these events have not occurred, the vehicle has most likely continued on the road it was on in the previous fix. Furthermore, if it was determined, for instance, that the vehicle made a left turn then it would not make sense to pin the GPS data to a point that would require a right turn. Lastly, the measured vehicle speed direction at these points is used to verify that the location fix was pinned correctly. If the new point results in a route that requires the vehicle to move in a direction that is not consistent with the measured speed, then it is clear that the point was pinned incorrectly.

These additional checks can be reflected in the cost associated with the different possible road segments for the next fix. If the vehicle did not turn significantly, then the road the vehicle was on in the last fix would have the lowest cost. Additionally, if it was determined that the vehicle made a left turn, any road segments requiring right turns would be assigned a very high cost so that they would not be chosen. Lastly, an additional benefit to performing this analysis in real time is that the number of road segments, K, chosen at each fix can vary each location fix, allowing the process to be optimized for the driving conditions. For instance, if the vehicle was previously on a highway where the number of exits (i.e. turns off of the road) is limited, than the number of road segments to consider can be limited to one or two. Conversely, in a crowded city there are likely many more route options to consider.

Accessing Continuous Accelerometer Data in the Background

In order to use the sensor fusion techniques described above, it is necessary for the system to be able to access motion sensor data (e.g. accelerometer) continuously in the background throughout the drive. The drive may last many minutes or hours. Many mobile devices and operating systems are designed to attempt to put the processor to sleep after a certain period of inactivity in order to save power. Although mechanisms such as wake locks can sometimes be used to keep the processor awake, the sub-processor providing the sensor data may go to sleep when the screen turns off. We utilize one or both of two different techniques to deal with this behavior.

Adaptive Registration Technique

In this technique, the system listens for the event when the screen turns off and then re-registers for motion sensor data with the operating system, at opportune times. Re-registering for motion sensor data typically involves a few simple API calls, namely unregistering for sensor data followed by registering again. After this action is performed, sensor data will again be provided to the system, but only for a limited and unknown period of time afterward (e.g. 500 ms-90 s). Sooner or later, the operating system will again attempt to shut down the motion sensor sub-processor once again preventing sensor data from being logged. The system may attempt to repeat the re-registration process periodically, e.g. every 500 ms-90 s, however this comes at a price: each re-registration attempt takes time, resulting in a gap in motion sensor data of 20-500 ms. This gap may vary depending on device, operating system (OS), or other concurrently running processes. Also, on some devices and OS's, if the system attempts to re-register too frequently (e.g. more than once every 200 ms), the operating system may become overwhelmed and the re-registration attempts backlogged.

To solve this problem the system adaptively determines when it is time to re-register, based on the data that is being logged. It does so by examining (periodically or otherwise) how much time has elapsed since the last motion sensor sample was received. Once a certain time T has elapsed, it performs a re-registration. In this way, the system is able to rapidly detect when access to motion sensor data has been prevented, and correct the problem.

Figure 17:
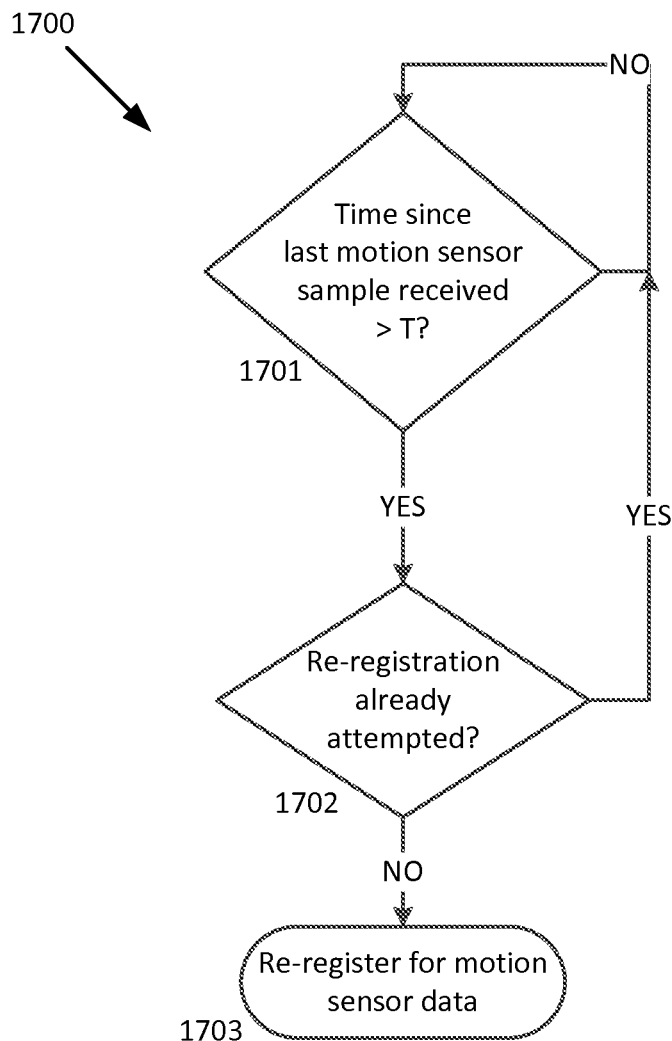
FIG. 17 is an exemplary flowchart of an adaptive re-registration technique.

One potential problem with this re-registration approach is that if the amount of time it takes to re-register is greater than T, then the system will fire off a second re-registration request before the first one has completed. In some cases, this can lead to positive feedback effects where the system is continually re-registering over and over again, without allowing the operating system time to start delivering motion sensor data again. To solve this problem a Boolean state can be kept, that indicates whether a motion sensor sample has been received since the last re-registration attempt. If TRUE, i.e. if no motion sensor sample has been received since the last re-registration attempt, the system does not attempt a further re-registration. This prevents any possible feedback attempts and results in a stream of motion sensor data that is near continuous, with very few large gaps. This technique is summarized in the flowchart 1700 of FIG. 17, showing an exemplary adaptive re-registration technique. In block 1701, it is determined whether the time since the last motion sensor sample was received is greater than the threshold T. If the time does not exceed the threshold, then the procedure returns to block 1701. If the threshold is exceeded, then the system determines in block 1702 if re-registration has already been attempted. If re-registration has already been attempted, the system returns to block 1701; if not, then re-registration for motion sensor data is performed in block 1703.

Black Screen Technique

Another way of accessing continuous motion sensor data throughout the drive is to create a completely black screen. The vast majority of devices on the market today have AMOLED displays that do not use any light when creating the color black. On these devices a completely black screen is indistinguishable from a screen that is turned off. The system can enable the black screen when the screen attempts to turn off (by the user switching it off, the screen timing out, or otherwise), i.e. when the SCREEN_OFF event is received. When the screen attempts to come back on—i.e. when a second SCREEN_OFF event is received—the original display is brought back to the foreground.

Inferring a Drive Route from Sparse Location Fixes Using a Driving Directions API In order to use location fixes to retroactively learn a drive route that was taken by a mobile device, without severely impacting battery life or accuracy, two things must happen: 1) location fixes must be collected only during the route, not at other, superfluous times, and 2) fixes must be obtained sparsely throughout the route. For a contra-positive example, observe the high battery drain associated with navigation apps. Of the two items listed above in this paragraph, the first of these things is achieved via the triggering/monitoring state architecture. The second is achieved in the monitoring state by waking up only infrequently to acquire a location fix.

When the monitoring state is entered, location fixes may be obtained with a fixed periodicity of say 1 minute, or with a periodicity that is modulated, say between 30 seconds-5 minutes. The periodicity may be selected based on several factors such as vehicle speed, a route prediction, etc., in order to obtain a more accurate interpolation with fewer samples. For example, in regions that are dense and unpredictable (such as downtown) more frequent fixes are obtained, whereas in regions that are sparse and predictable (such as a freeway trip back home) fewer fixes are obtained. Vehicle speed may be used as a proxy for this, e.g. if the instantaneous speed is below 30 mph, the user is assumed to be driving on an urban road and fixes are taken every 30 seconds, if the speed is between 30 and 50 mph, the user is assumed to be driving on a suburban road and fixes are taken every 60 seconds, and if the speed if greater than 50 mph, the user is assumed to be driving on a highway/freeway and fixes are taken every 120 seconds. These numerical values are listed only as examples, and are not limited to these exact quantities.

Figure 18B:
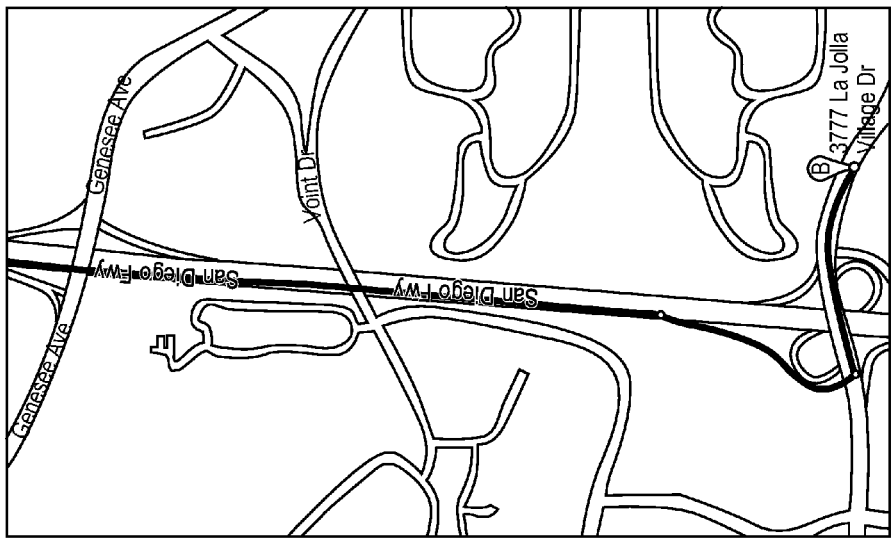
FIGS. 18A-18B show exemplary erroneous routes returned by a driving directions application programming interface (API) due to noisy location fixes.
Figure 18A:
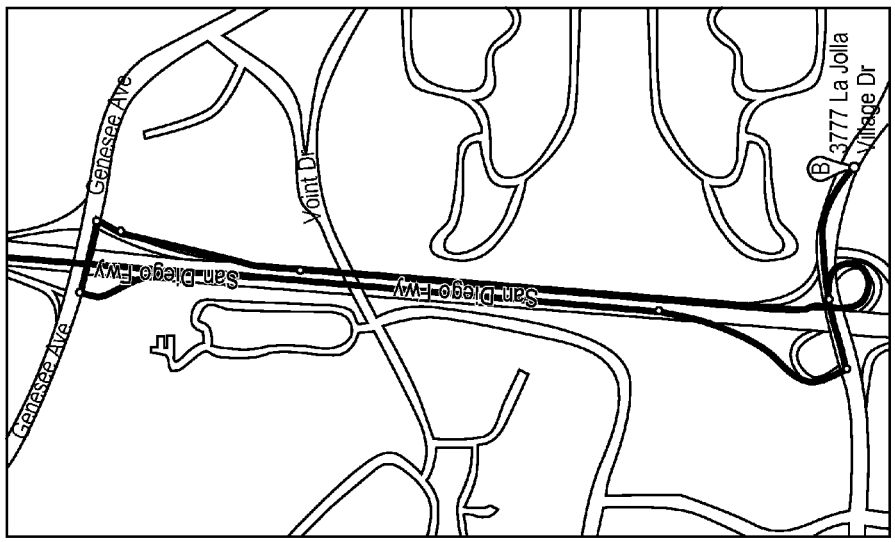

At the end of the trip, the fixes are interpolated using a driving directions database. The database may have an API that when queried with a series of fixes, interprets the first and last fixes as the start and end of the route, respectively, and fixes in between as desired waypoints visited by the user. As the fixes are not perfectly accurate, a small error can lead to a gross miscalculation of the route taken. For example, if a fix is obtained while the user is driving across an overpass over a freeway, a small offset of as little as 5 meters can cause the directions API to return a route that takes the user onto the freeway, driving many additional miles before exiting and driving back to rejoin the route consistent with the remaining waypoints. This problem is illustrated in diagram 180 of FIG. 18A and diagram 185 of FIG. 18B, which show an example of an erroneous route returned by driving directions API due to noisy location fixes. In the route of FIG. 18A, a noisy location fix lands on the wrong side of the freeway causing the directions API to infer a loopy route. The route shown in FIG. 18B is correct.

As a primary use of this interpolation is for accurate estimation of mileage driven for auto-insurance telematics purposes, the directions API alone may be grossly insufficient (often worse than just connecting the sparse location fixes with straight lines). This is an artifact of the API used: it provides directions via waypoints, it does not provide an interpolated driving route.

The algorithm builds a route interpolation API from a driving directions API. The goal of the algorithm is to find a subset of waypoints that when fed into the driving directions API return the route both consistent with the location fixes observed and with the shortest possible length (or quickest drive time). This is illustrated in diagram 191 of FIG. 19A, 192 of FIG. 19B, and 193 of FIG. 19C, which show an exemplary goal of the route interpolation algorithm. Goal of route interpolation algorithm. The assumption here is that the driver took the most direct (or quickest) route consistent with the observed location fixes. Though route 191 of FIG. 19A is shortest, it is not consistent with the location fixes observed and is hence invalid. The route 192 of FIG. 19B is consistent but is unnecessarily long. The route 193 of FIG. 19C is the desired output, as it is the shortest consistent route.

A location fix is defined to be consistent with a given route (or route to be consistent with a given location fix), if the route passes sufficiently close to it. This may be defined in many ways: in terms of the accuracy of the reported location fix, the density of the road network in the vicinity of the fix, etc.

Figures 20A, 20B:
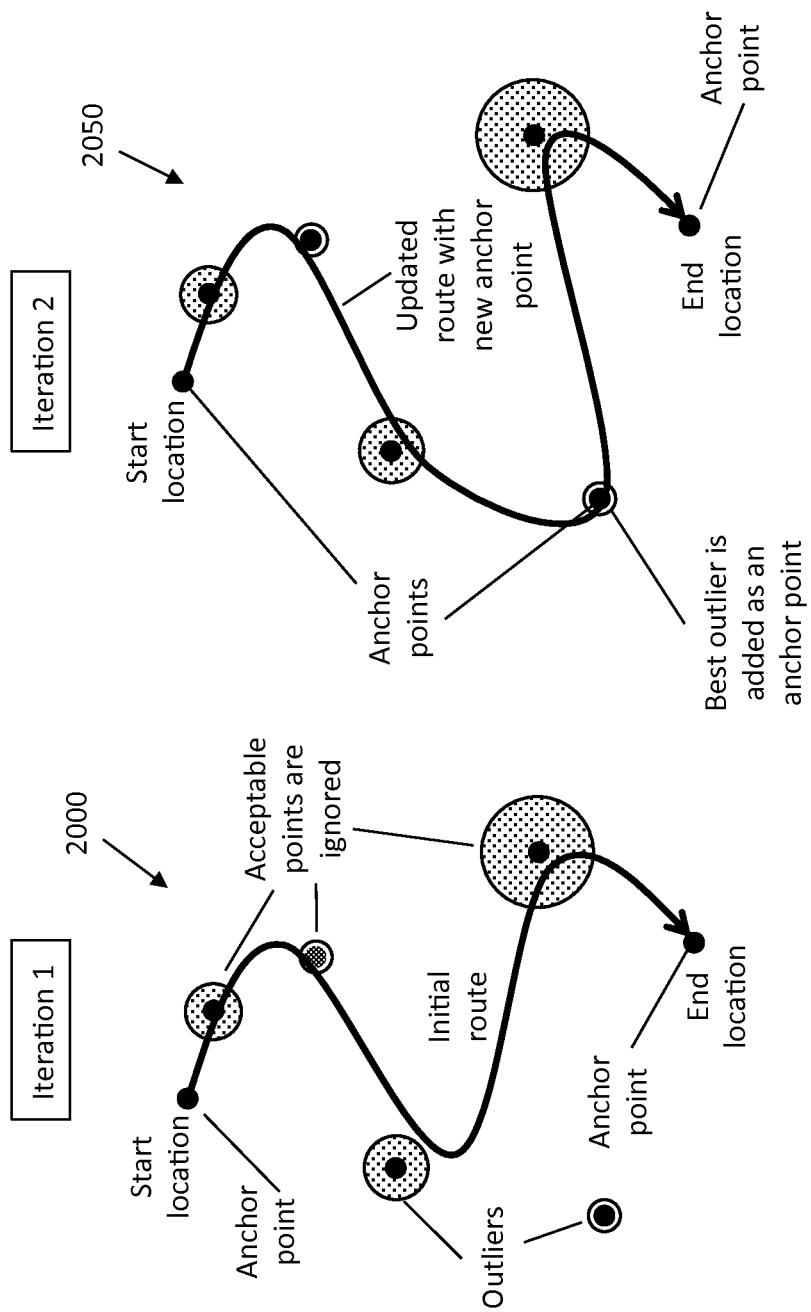
FIGS. 20A-20B are exemplary diagrams of recursive route interpolation.

The procedure starts with the first and last fix obtained during the drive, (which may for various reasons be the most accurate ones obtained). The procedure is illustrated in diagrams 2000 and 2050 of FIGS. 20A-20B, respectively, showing an embodiment of recursive route interpolation. These points for the first and last fix are designated as anchor points. This set of anchor points is sent to the directions API with the first anchor point representing the start point of the drive and the last anchor point representing the end point. Those intermediate location fixes that are sufficiently close to the returned drive route are designated as ignored points, as shown in diagram 2000. From the set of intermediate location fixes that are not sufficiently close to the return drive route, a "best" location fix is selected and added to the set of anchor points. The anchor points are ordered chronologically according to the time the respective location fixes were obtained. The set of anchor points is then again sent to the directions API, with the first anchor point representing the start point of the drive, the last anchor point representing the end point of the drives, and the intermediate location fix representing a waypoint. The waypoint represents a detour in the shortest (or quickest) route between the start and end location. This procedure is recursively repeated, such as in diagram 2050, on remaining segments of the route that contain points yet to be designated either anchor or ignore points. When all location fixes have been labeled either anchor or ignore points, the procedure terminates. The final set of anchor points is considered a minimal set of location fixes necessary to characterize the route, including its start and end points, and any detours. The last route returned by the directions API will also correspond to this final set of anchor points and hence be used as the inferred driving route.

As location fixes are reported together with an accuracy value (e.g. 26 m), the reported accuracy is used in determining whether a fix is considered sufficiently close to a route. One embodiment defines a fix as sufficiently close if it lies within either $D_{min}$ meters of the nearest point on the route, or within K times the reported accuracy of the fix, so long as the fix is no more than $D_{max}$ meters from the nearest point on the route. Typical parameter settings are, for example, K=2-4, $D_{min}$=20-40 m $D_{max}$=200-300 m.

An intermediate fix is selected as the "best" way point based on its accuracy and deviation from the route. One embodiment is to select the way point that maximizes the ratio of the accuracy of the location fix to the minimum geodesic distance from the route.

The route inference procedure can be improved by, during each recursion, after each route is returned, performing additional checks to ensure the selected best way point does not result in looping such as in the freeway overpass scenario illustrated in FIGS. 18A-18B. One such check is to disqualify a selected "best" way point if its inclusion as an anchor point results in a route that contains "overlap in the same direction." This is defined as a route that at two different times follows precisely the same underlying road geometry for at least a certain number of points. This is precisely the error that occurs in the example of FIG. 18A.

Additionally, when the recursion has terminated, a series of anchor point manipulations is performed to determine if a shorter route, consistent with the fixes, can be obtained. This procedure is very helpful in removing errors that occur due to a high density of grid points in the underlying road geometry within the vicinity of an anchor point. These manipulations are performed by going through each anchor point in the final set, one by one, and perturbing it by a small amount. The new anchor point set (containing the perturbed point) is then sent to the directions API. If the returned driving route is significantly shorter than the existing driving route, and no inconsistencies have been created, then the perturbation is kept. Multiple perturbations may be performed for each anchor point. These perturbations may be done in many different ways. For example, for each point it can be moved a fixed distance (e.g. 20 m) in each compass direction (N, S, E and W). Alternatively the underlying road geometry can be accessed within the vicinity of the anchor point to determine which potential perturbations may result in a route of shorter length. Note the underlying road geometry can also be used within the vicinity of an anchor point to determine if a location fix should be selected as a "best" point/anchor point, to begin with.

Additional information may also be incorporated when inferring the drive route, for example: 1) the elapsed duration between location fixes, 2) the bearing of the vehicle obtained from the location fixes, relative to the bearing of candidate road segments, 3) any previous routes traveled.

An additional check for whether the calculated drive route is consistent with the intermittent location fixes can be done by using the measured vehicle speed direction at each of these fixes. A route speed direction can also be determined for these fixes by determining the change in position between points on the calculated route. For the location fixes to be consistent with the calculated route, the measured speed direction and the route speed direction must be approximately aligned. If this is not the case, a new route must be calculated.

Sample Telematics Data Outputted by the System

In FIG. 21 is an example of telematics data outputted by the system, either in real-time or post-processing mode. Data is outputted at 4 Hz such that each row corresponds to a 250 ms sample.

The description of the fields in each column are

DATE—date of corresponding sample in YYYY-MM-DD format

TIME—time of sample in 24 hr format

ELAPSED_TIME—seconds since the beginning of the trip (to the nearest millisec). With default output frequency of 4 Hz, this value increments by 0.250 each row.

LATITUDE—latitude at corresponding sample time. This point lies on directly route and can be computed using ROUTE_LEG, FRACTION_OF_LEG and routeTaken.csv.

LONGITUDE—latitude at corresponding sample time. Derived from computed route, not GPS. This point lies on directly route and can be computed using ROUTE_LEG, FRACTION_OF_LEG and routeTaken.csv.

ROUTE_LEG, FRACTION_OF_LEG—a reference to the precise location along the computed route. ROUTE_LEG indicates the current road segment in routeTaken.csv; FRACTION_OF_LEG indicates the fraction of that road segment traversed at the current time.

ROAD NAME—name of the road driven on during sample time. Not available in first release.

SPEED—current speed of vehicle in miles/hour

MILEAGE—cumulative distance traveled since beginning of trip (miles).

LINEAR_G_FORCE—G-force in the longitudinal direction, i.e. direction of motion of the vehicle. Positive values correspond to acceleration, negative braking LATERAL_G_FORCE—G-force in the direction perpendicular to the direction of motion of the vehicle. Positive values correspond to right corners/swerves, negative left.

VERTICAL_G_FORCE—G-force in the vertical direction. Positive values correspond to downward acceleration, negative upward.

DATA_UNUSABLE—flag that indicates that the G-force estimates are likely inaccurate. This most commonly occurs when the mobile device is moved excessively within the vehicle (e.g. moving in user hand).

RIGHT_TURN—indicates a right turn took place at this sample. Only one RIGHT_TURN indicator will be set for each right turn that occurred during the drive.

LEFT_TURN—indicates a left turn took place at this sample. Only one LEFT_TURN indicator will be set for each right turn that occurred during the drive.

HARD_BRAKE—indicates the linear G-force in the negative direction exceeds a threshold of 0.31 g (threshold adjustable).

HARD_ACCEL—indicates the linear G-force in the positive direction exceeds a threshold of 0.25 g (threshold adjustable).

HARD_RIGHT_CORNER—indicates the lateral G-force in the positive direction exceeds a threshold of 0.40 g (threshold adjustable).

HARD_LEFT_CORNER—indicates the lateral G-force in the positive direction exceeds a threshold of 0.40 g (threshold adjustable).

In this document, various computer-implemented methods, processes and procedures are described. It is to be understood that the various actions (storing, determining, computing, calculating, estimating, etc.) are performed by hardware, such as general-purpose computing hardware devices, even if the action may be authorized, initiated or triggered by a user, or even if the hardware computing processor is controlled by a computer program, software, firmware, etc. Further, it is to be understood that the hardware is operating on data, even if the data may represent concepts or real-world objects, thus the explicit labeling as "data" as such is omitted. For example, when the hardware device is described as "storing a signal," it is to be understood that the hardware device is storing data that represents the signal.

Figure 22:
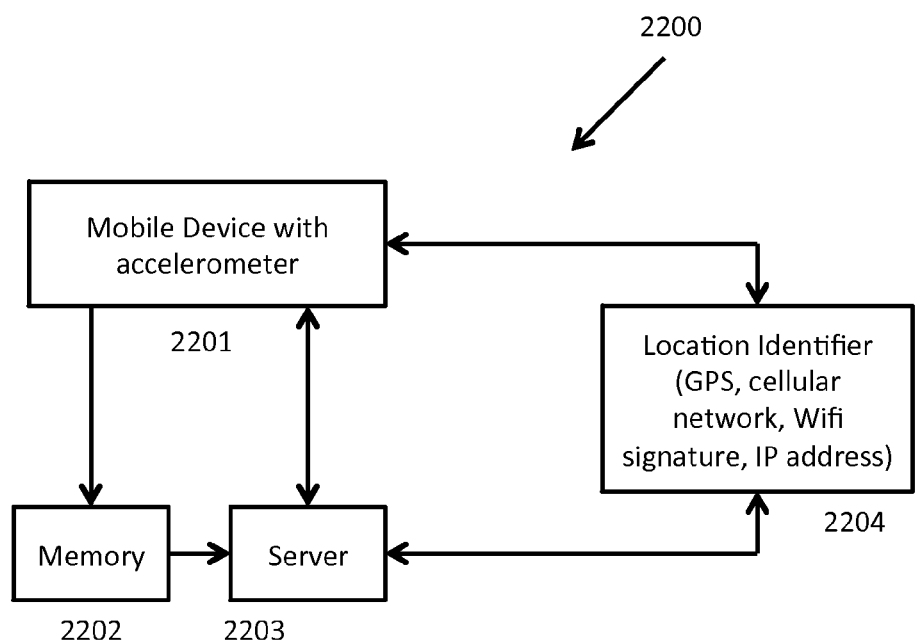
FIG. 22 is an embodiment of a computer-implemented system including a mobile device.

An exemplary embodiment of a computer-implemented system with a mobile device is provided in FIG. 22. In system 2200 of FIG. 22, a mobile device 2201 is, for example, a smartphone, tablet or smartwatch, and includes an accelerometer. The mobile device 2201 records and stores data, such as audio signals and accelerometer data, on its own internal memory, or in other embodiments, may store data on an external memory device 2202. Memory device 2202 may be, for example, a personal computer, system server, or cloud storage. In some embodiments, memory 2202 is part of a server 2203. Server 2203 is a general-purpose computer that is capable of hosting and performing computations for a telematics software program, such as has been described herein. Mobile device 2201 and server 2203 communicate with a location identifier 2204, where location identifier 2204 may be a GPS system, cellular network, Wifi signature identifier, or IP address. Data from location identifier 2204 can be used to provide information for the telematics software program, such as geographic positions for estimating driving routes. Using data from mobile device 2201, memory 2202, and location identifier 2204, the server 2203 performs operations for the telematics software such as storing accelerometer data, calculating statistics, computing device usage delimiters, estimating gravity vectors, computing nullspaces, projecting accelerometer data onto the nullspaces, and correlating accelerometer data with GPS data to infer movements of a vehicle.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A method of computing an orientation of a mobile device in a vehicle, the method comprising:
    collecting accelerometer data from the mobile device traveling in the vehicle, the accelerometer data comprising acceleration vectors with acceleration values for three orthogonal axes;
    subdividing the accelerometer data into frames, each frame being a quantity of time in which a sample data point is taken;
    calculating statistics for each frame, using a hardware computing processor, the statistics comprising (i) a mean of the acceleration vectors and (ii) a standard deviation of a magnitude of the acceleration vectors;
    computing device usage delimiters, using a hardware computing processor, the device usage delimiters marking start and end points of a coherent block, the coherent block comprising consecutive frames in which the mobile device stays in the same orientation relative to the vehicle;
    estimating a gravity vector, using the statistics from the accelerometer data in coherent blocks;
    computing a nullspace from the gravity vector, the nullspace being a plane orthogonal to the gravity vector; and
    projecting the accelerometer data onto the nullspace, the projecting resulting in an estimated orientation of the mobile device in the vehicle.

2. The method of claim 1 further comprising calibrating the accelerometer, using the statistics from the accelerometer data.

3. The method of claim 1 wherein the computing device usage delimiters comprises:
    calculating a similarity metric, the similarity metric being a normalized inner product of the acceleration vectors in adjacent frames; and
    determining if the similarity metric meets a predetermined criteria.

4. The method of claim 3 wherein the estimating a gravity vector comprises excluding incoherent blocks, an incoherent block being consecutive frames in which the similarity metric fails to meet the predetermined criteria and in which the incoherent block has a duration less than a predetermined threshold.

5. The method of claim 4 wherein for the incoherent blocks, other sensor data from the mobile device is used in addition to the accelerometer data to compute the orientation of the mobile device.

6. The method of claim 5 wherein the other sensor data comprises gyroscope or magnetometer data.

7. The method of claim 1 wherein the estimating a gravity vector comprises summing the mean accelerometer values over a window of frames, the mean accelerometer values being exponentially weighted according to the standard deviation of the magnitude of the acceleration vectors, wherein smaller standard deviations are given larger weightings.

8. The method of claim 1 further comprising collecting global positioning system (GPS) data during a plurality of brief segments of time to obtain speed and position values.

9. The method of claim 8 further comprising:
obtaining longitudinal and lateral accelerometer data from the projecting of the accelerometer data onto the nullspace; and
correlating longitudinal and lateral accelerometer data with longitudinal G-forces estimates from the GPS data.

10. The method of claim 8 further comprising setting data unusable flags for frames that are delimited as incoherent blocks, or that have insufficient longitudinal G-force GPS data.

11. The method of claim 8 further comprising interpolating speed estimates for an interval between GPS time segments, by integrating longitudinal acceleration data over the interval, wherein the longitudinal acceleration data is relative to the nullspace.

12. The method of claim 8 further comprising:
computing a plurality of nearest route segments and associated distances, for each position value;
computing an optimal path of route segments such that each route segment is associated with one position value, and such that if a first position value is obtained from an earlier segment of time than a second position value, then the route segment associated with the first position value occurs earlier in the route than the route segment associated with the second position value; and
pinning each position value to the nearest point on its associate route segment.

13. The method of claim 1 further comprising:
storing the statistics, after the statistics are calculated; and
discarding the accelerometer data that was collected from the mobile device.

14. A method of inferring movements of a vehicle, the method comprising:
collecting accelerometer data from the mobile device traveling in the vehicle, the accelerometer data comprising acceleration vectors with acceleration values for three orthogonal axes;
subdividing the accelerometer data into frames, each frame being a quantity of time in which a sample data point is taken;
calculating statistics for each frame, using a hardware computing processor, the statistics comprising (i) a mean of the acceleration vectors and (ii) a standard deviation of a magnitude of the acceleration vectors;
computing device usage delimiters, using a hardware computing processor, the device usage delimiters marking start and end points of a coherent block, the coherent block comprising consecutive frames in which the mobile device stays in the same orientation relative to the vehicle;
estimating a gravity vector, using the statistics from the accelerometer data in coherent blocks;
computing a nullspace, using the gravity vector, the nullspace being a plane orthogonal to the gravity vector;
projecting the accelerometer data onto the nullspace, wherein the nullspace provides a forward direction of vehicle movement;
collecting global positioning system (GPS) data during a plurality of brief segments of time to obtain speed and position values;
correlating longitudinal and lateral accelerometer data with longitudinal G-forces estimates from the GPS data, the longitudinal and lateral accelerometer data being relative to the nullspace;
correcting for speed drift by (a) identifying periods of time when the vehicle is stationary, based on the GPS position values, and (b) setting G-force values to zero for those periods; and
determining vehicle speed estimates, comprising calculating vehicle speed estimates for intervals between the segments of collecting GPS data.

15. The method of claim 14 further comprising estimating a vehicle position by fusing the vehicle speed estimates with route and road geometry information.

16. The method of claim 15 further comprising:
computing a route taken by the vehicle using the estimated vehicle positions and the road geometry information; and
interpolating a position of the vehicle during segments of time in which the GPS position data is not collected on the mobile device, using the vehicle speed estimates, the estimated vehicle positions, and the computed route taken by the vehicle.

17. The method of claim 16 wherein the interpolating the position of the vehicle comprises:
finding points on the computed route associated with each interpolated position; and
interpolating a distance of the vehicle along the route, between the found points.

18. The method of claim 17 wherein the finding points comprises:
computing a plurality of nearest route segments and associated distances, for each position value;
computing an optimal path of route segments such that each route segment is associated with one position value, and such that if a first position value is obtained from an earlier segment of time than a second position value, then the route segment associated with the first position value occurs earlier in the route than the route segment associated with the second position value; and
pinning each position value to the nearest point on its associated route segment.

19. The method of claim 14, wherein the computing device usage delimiters comprises:
calculating a similarity metric, the similarity metric being a normalized inner product of the acceleration vectors in adjacent frames; and
determining if the similarity metric meets a predetermined criteria.

20. The method of claim 19, wherein the estimating a gravity vector comprises excluding incoherent blocks, an incoherent block being consecutive frames in which the similarity metric fails to meet the predetermined criteria and which have a duration less than a predetermined threshold.

* * * * *